US007979829B2

(12) United States Patent
Smayling

(10) Patent No.: US 7,979,829 B2
(45) Date of Patent: Jul. 12, 2011

(54) INTEGRATED CIRCUIT CELL LIBRARY WITH CELL-LEVEL PROCESS COMPENSATION TECHNIQUE (PCT) APPLICATION AND ASSOCIATED METHODS

(75) Inventor: Michael C. Smayling, Fremont, CA (US)

(73) Assignee: Tela Innovations, Inc., Los Gatos, CA (US)

(*) Notice: Subject to any disclaimer, the term of this patent is extended or adjusted under 35 U.S.C. 154(b) by 615 days.

(21) Appl. No.: 12/033,807

(22) Filed: Feb. 19, 2008

(65) Prior Publication Data

US 2010/0306719 A1 Dec. 2, 2010

Related U.S. Application Data

(60) Provisional application No. 60/890,819, filed on Feb. 20, 2007.

(51) Int. Cl.
*G06F 17/50* (2006.01)
(52) U.S. Cl. ........................................................ 716/119
(58) Field of Classification Search ............... 716/4, 119
See application file for complete search history.

(56) References Cited

U.S. PATENT DOCUMENTS

| 4,197,555 A | 4/1980 | Uehara et al. ............... 357/70 |
| 4,417,161 A | 11/1983 | Uya |
| 4,424,460 A | 1/1984 | Best |
| 4,682,202 A | 7/1987 | Tanizawa |
| 5,208,765 A | 5/1993 | Turnbull |
| 5,378,649 A | 1/1995 | Huang ............................. 437/52 |
| 5,471,403 A | 11/1995 | Fujimaga |
| 5,497,334 A | 3/1996 | Russell et al. |
| 5,497,337 A | 3/1996 | Ponnapalli et al. |
| 5,581,098 A | 12/1996 | Chang ........................... 257/211 |
| 5,682,323 A | 10/1997 | Pasch et al. ................... 364/491 |
| 5,684,733 A | 11/1997 | Wu et al. ........................ 365/100 |
| 5,705,301 A | 1/1998 | Garza et al. |

(Continued)

FOREIGN PATENT DOCUMENTS

JP 2002-258463 9/2002

(Continued)

OTHER PUBLICATIONS

Acar, et al., "A Linear-Centric Simulation Framework for Parametric Fluctuations", 2002, . IEEE, Carnegie Mellon University USA, pp. 1-8.

(Continued)

*Primary Examiner* — Jack Chiang
*Assistant Examiner* — Brandon W Bowers
(74) *Attorney, Agent, or Firm* — Martine Penilla & Gencarella, LLP

(57) ABSTRACT

A layout of cells is generated to satisfy a netlist of an integrated circuit. Cell-level process compensation technique (PCT) processing is performed on a number of levels of one or more cells in the layout to generate a PCT processed version of the one more cells in the layout. An as-fabricated aerial image of each PCT processed cell level is generated to facilitate evaluation of PCT processing adequacy. Cell-level circuit extraction is performed on the PCT processed version of each cell using the generated as-fabricated aerial images. The cell-level PCT processing and cell-level circuit extraction are performed before placing and routing of the layout on a chip. The PCT processed version of the one or more cells and corresponding as-fabricated aerial images are stored in a cell library.

21 Claims, 11 Drawing Sheets

U.S. PATENT DOCUMENTS

| | | | |
|---|---|---|---|
| 5,790,417 A | 8/1998 | Chao et al. | |
| 5,796,624 A | 8/1998 | Sridhar et al. | |
| 5,825,203 A | 10/1998 | Kusunoki et al. | 326/41 |
| 5,838,594 A | 11/1998 | Kojima | |
| 5,841,663 A | 11/1998 | Sharma et al. | 364/490 |
| 5,847,421 A | 12/1998 | Yamaguchi | 257/207 |
| 5,858,580 A | 1/1999 | Wang et al. | |
| 5,898,194 A | 4/1999 | Gheewala | 257/206 |
| 5,900,340 A | 5/1999 | Reich et al. | |
| 5,908,827 A | 6/1999 | Sirna | 514/12 |
| 5,923,059 A | 7/1999 | Gheewala | 257/204 |
| 5,935,763 A | 8/1999 | Caterer et al. | 430/313 |
| 5,973,507 A | 10/1999 | Yamazaki | |
| 5,977,305 A | 11/1999 | Wigler et al. | 530/350 |
| 6,009,251 A | 12/1999 | Ho et al. | |
| 6,037,617 A | 3/2000 | Kumagai | |
| 6,044,007 A | 3/2000 | Capodieci | |
| 6,063,132 A | 5/2000 | DeCamp et al. | |
| 6,091,845 A | 7/2000 | Pierrat et al. | |
| 6,099,584 A | 8/2000 | Arnold et al. | |
| 6,100,025 A | 8/2000 | Wigler et al. | 435/6 |
| 6,174,742 B1 | 1/2001 | Sudhindranath et al. | 438/14 |
| 6,182,272 B1 | 1/2001 | Andreev et al. | 716/13 |
| 6,194,104 B1 | 2/2001 | Hsu | |
| 6,194,252 B1 | 2/2001 | Yamaguchi | 438/129 |
| 6,194,912 B1 | 2/2001 | Or-Bach | 326/38 |
| 6,209,123 B1 | 3/2001 | Maziasz et al. | |
| 6,230,299 B1 | 5/2001 | McSherry et al. | |
| 6,232,173 B1 | 5/2001 | Hsu et al. | |
| 6,240,542 B1 | 5/2001 | Kapur | 716/12 |
| 6,255,600 B1 | 7/2001 | Schaper | 174/255 |
| 6,262,487 B1 | 7/2001 | Igarashi et al. | |
| 6,269,472 B1 | 7/2001 | Garza et al. | |
| 6,275,973 B1 | 8/2001 | Wein | 716/10 |
| 6,282,696 B1 | 8/2001 | Garza et al. | |
| 6,331,733 B1 | 12/2001 | Or-Bach et al. | 257/758 |
| 6,335,250 B1 | 1/2002 | Egi | |
| 6,338,972 B1 | 1/2002 | Sudhindranath et al. | 438/14 |
| 6,356,112 B1 | 3/2002 | Tran et al. | |
| 6,370,679 B1 | 4/2002 | Chang et al. | |
| 6,378,110 B1 | 4/2002 | Ho | |
| 6,388,296 B1 | 5/2002 | Hsu | |
| 6,393,601 B1 | 5/2002 | Tanaka et al. | |
| 6,415,421 B2 | 7/2002 | Anderson et al. | |
| 6,416,907 B1 | 7/2002 | Winder et al. | 430/5 |
| 6,421,820 B1 | 7/2002 | Mansfield et al. | |
| 6,425,112 B1 | 7/2002 | Bula et al. | |
| 6,425,117 B1 | 7/2002 | Pasch et al. | 716/21 |
| 6,426,269 B1 | 7/2002 | Haffner et al. | |
| 6,436,805 B1 | 8/2002 | Trivedi | |
| 6,470,489 B1 | 10/2002 | Chang et al. | |
| 6,476,493 B2 | 11/2002 | Or-Bach et al. | 257/758 |
| 6,477,695 B1 | 11/2002 | Gandhi | |
| 6,480,989 B2 | 11/2002 | Chan et al. | 716/8 |
| 6,492,066 B1 | 12/2002 | Capodieci et al. | |
| 6,496,965 B1 | 12/2002 | van Ginneken et al. | |
| 6,505,327 B2 | 1/2003 | Lin | 716/5 |
| 6,505,328 B1 | 1/2003 | van Ginneken et al. | |
| 6,509,952 B1 | 1/2003 | Govil et al. | |
| 6,514,849 B1 | 2/2003 | Hui et al. | |
| 6,516,459 B1 | 2/2003 | Sahouria | |
| 6,523,156 B2 | 2/2003 | Cirit | |
| 6,525,350 B1 | 2/2003 | Kinoshita et al. | 257/202 |
| 6,536,028 B1 | 3/2003 | Katsioulas et al. | 716/17 |
| 6,553,544 B2 | 4/2003 | Tanaka et al. | |
| 6,553,559 B2 | 4/2003 | Liebmann et al. | |
| 6,571,140 B1 | 5/2003 | Wewalaarachchi et al. | 700/83 |
| 6,571,379 B2 | 5/2003 | Takayama | |
| 6,578,190 B2 | 6/2003 | Ferguson et al. | |
| 6,590,289 B2 | 7/2003 | Shively | 257/758 |
| 6,591,207 B2 | 7/2003 | Naya et al. | 702/81 |
| 6,609,235 B2 | 8/2003 | Ramaswamy et al. | |
| 6,610,607 B1 | 8/2003 | Armbrust et al. | |
| 6,620,561 B2 | 9/2003 | Winder et al. | 430/5 |
| 6,633,182 B2 | 10/2003 | Pileggi et al. | |
| 6,643,831 B2 | 11/2003 | Chang et al. | |
| 6,661,041 B2 | 12/2003 | Keeth | 257/211 |
| 6,673,638 B1 | 1/2004 | Bendik et al. | |
| 6,687,895 B2 | 2/2004 | Zhang | |
| 6,691,297 B1 | 2/2004 | Misaka et al. | 716/21 |
| 6,714,903 B1 | 3/2004 | Chu et al. | 703/19 |
| 6,732,338 B2 | 5/2004 | Crouse et al. | |
| 6,737,199 B1 | 5/2004 | Hsieh | 430/5 |
| 6,737,347 B1 | 5/2004 | Houston et al. | |
| 6,745,372 B2 | 6/2004 | Cote et al. | 716/2 |
| 6,749,972 B2 | 6/2004 | Yu | |
| 6,760,269 B2 | 7/2004 | Nakase et al. | |
| 6,765,245 B2 | 7/2004 | Bansal | |
| 6,777,138 B2 | 8/2004 | Pierrat et al. | |
| 6,777,146 B1 * | 8/2004 | Samuels | 430/30 |
| 6,789,246 B1 | 9/2004 | Mohan et al. | |
| 6,792,593 B2 | 9/2004 | Takashima et al. | 716/21 |
| 6,794,914 B2 | 9/2004 | Sani et al. | |
| 6,795,952 B1 | 9/2004 | Stine et al. | 716/5 |
| 6,795,953 B2 | 9/2004 | Bakarian et al. | |
| 6,807,663 B2 * | 10/2004 | Cote et al. | 716/21 |
| 6,819,136 B2 | 11/2004 | Or-Bach | 326/41 |
| 6,826,738 B2 | 11/2004 | Cadouri | |
| 6,834,375 B1 | 12/2004 | Stine et al. | 716/2 |
| 6,841,880 B2 | 1/2005 | Matsumoto et al. | |
| 6,850,854 B2 | 2/2005 | Naya et al. | 702/81 |
| 6,854,096 B2 | 2/2005 | Eaton et al. | |
| 6,854,100 B1 | 2/2005 | Chuang et al. | 716/5 |
| 6,877,144 B1 | 4/2005 | Rittman et al. | 716/10 |
| 6,884,712 B2 | 4/2005 | Yelehanka et al. | 438/622 |
| 6,898,770 B2 | 5/2005 | Boluki et al. | |
| 6,904,582 B1 | 6/2005 | Rittman et al. | 716/10 |
| 6,918,104 B2 | 7/2005 | Pierrat et al. | |
| 6,928,635 B2 | 8/2005 | Pramanik et al. | 716/21 |
| 6,931,617 B2 | 8/2005 | Sanie et al. | 716/18 |
| 6,953,956 B2 | 10/2005 | Or-Bach et al. | 257/203 |
| 6,954,918 B2 | 10/2005 | Houston | |
| 6,957,402 B2 | 10/2005 | Templeton et al. | |
| 6,968,527 B2 | 11/2005 | Pierrat | |
| 6,978,436 B2 | 12/2005 | Cote et al. | |
| 6,978,437 B1 | 12/2005 | Rittman et al. | 716/21 |
| 6,992,925 B2 | 1/2006 | Peng | 365/177 |
| 6,993,741 B2 | 1/2006 | Liebmann et al. | |
| 7,028,285 B2 | 4/2006 | Cote et al. | 716/21 |
| 7,041,568 B2 | 5/2006 | Goldbach et al. | 438/387 |
| 7,052,972 B2 | 5/2006 | Sandhu et al. | |
| 7,063,920 B2 | 6/2006 | Baba-Ali | |
| 7,064,068 B2 | 6/2006 | Chou et al. | 438/687 |
| 7,065,731 B2 | 6/2006 | Jacques et al. | |
| 7,079,989 B2 | 7/2006 | Wimer | |
| 7,093,208 B2 | 8/2006 | Williams et al. | |
| 7,093,228 B2 | 8/2006 | Andreev et al. | 716/21 |
| 7,103,870 B2 | 9/2006 | Misaka et al. | 716/21 |
| 7,105,871 B2 | 9/2006 | Or-Bach et al. | |
| 7,107,551 B1 | 9/2006 | de Dood et al. | |
| 7,120,882 B2 | 10/2006 | Kotani et al. | 716/5 |
| 7,124,386 B2 | 10/2006 | Smith et al. | |
| 7,132,203 B2 | 11/2006 | Pierrat | |
| 7,137,092 B2 | 11/2006 | Maeda | 716/8 |
| 7,149,999 B2 | 12/2006 | Kahng et al. | 716/19 |
| 7,152,215 B2 | 12/2006 | Smith et al. | |
| 7,155,685 B2 | 12/2006 | Mori et al. | |
| 7,155,689 B2 | 12/2006 | Pierrat | 716/4 |
| 7,159,197 B2 | 1/2007 | Falbo et al. | |
| 7,174,520 B2 | 2/2007 | White et al. | |
| 7,175,940 B2 | 2/2007 | Laidig et al. | |
| 7,185,294 B2 | 2/2007 | Zhang | |
| 7,194,712 B2 | 3/2007 | Wu | |
| 7,219,326 B2 | 5/2007 | Reed et al. | |
| 7,225,423 B2 | 5/2007 | Bhattacharya et al. | |
| 7,227,183 B2 | 6/2007 | Donze et al. | |
| 7,231,628 B2 | 6/2007 | Pack et al. | |
| 7,252,909 B2 | 8/2007 | Shin et al. | |
| 7,264,990 B2 | 9/2007 | Rueckes et al. | |
| 7,278,118 B2 | 10/2007 | Pileggi et al. | 716/1 |
| 7,287,320 B2 | 10/2007 | Wang et al. | |
| 7,294,534 B2 | 11/2007 | Iwaki | |
| 7,302,651 B2 | 11/2007 | Allen et al. | |
| 7,335,966 B2 | 2/2008 | Ihme et al. | |
| 7,338,896 B2 | 3/2008 | Vanhaelemeersch et al. | |
| 7,350,183 B2 | 3/2008 | Cui et al. | |
| 7,353,492 B2 | 4/2008 | Gupta et al. | |

| | | |
|---|---|---|
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,383,521 B2 | 6/2008 | Smith et al. |
| 7,400,627 B2 | 7/2008 | Wu et al. |
| 7,404,173 B2 | 7/2008 | Wu et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,426,710 B2 | 9/2008 | Zhang et al. |
| 7,434,185 B2 | 10/2008 | Dooling et al. |
| 7,441,211 B1 | 10/2008 | Gupta et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,465,973 B2 | 12/2008 | Chang et al. |
| 7,466,607 B2 | 12/2008 | Hollis et al. |
| 7,480,880 B2 | 1/2009 | Visweswariah et al. |
| 7,484,197 B2 | 1/2009 | Allen et al. |
| 7,487,475 B1 | 2/2009 | Kriplani et al. |
| 7,506,300 B2 | 3/2009 | Sezginer et al. |
| 7,509,621 B2 | 3/2009 | Melvin |
| 7,509,622 B2 | 3/2009 | Sinha et al. |
| 7,514,959 B2 | 4/2009 | Or-Bach et al. |
| 7,523,429 B2 | 4/2009 | Kroyan et al. |
| 7,563,701 B2 | 7/2009 | Chang et al. |
| 7,665,051 B2 | 2/2010 | Ludwig et al. |
| 7,770,144 B2 | 8/2010 | Dellinger |
| 2003/0042930 A1 | 3/2003 | Pileggi et al. ............ 326/41 |
| 2003/0061592 A1 | 3/2003 | Agrawal et al. |
| 2003/0088842 A1 | 5/2003 | Cirit |
| 2003/0229875 A1 | 12/2003 | Smith et al. |
| 2004/0049754 A1 | 3/2004 | Liao et al. |
| 2004/0145028 A1 | 7/2004 | Matsumoto et al. ........ 257/620 |
| 2004/0153979 A1 | 8/2004 | Chang |
| 2004/0161878 A1 | 8/2004 | Or-Bach et al. ............ 438/113 |
| 2004/0243966 A1 | 12/2004 | Dellinger ................ 716/17 |
| 2005/0055828 A1 | 3/2005 | Wang et al. .............. 29/857 |
| 2005/0101112 A1 | 5/2005 | Rueckes et al. ............ 438/584 |
| 2005/0136340 A1* | 6/2005 | Baselmans et al. ........... 430/5 |
| 2005/0189614 A1 | 9/2005 | Ihme et al. .............. 257/532 |
| 2005/0224982 A1 | 10/2005 | Kemerling et al. ......... 257/758 |
| 2005/0229130 A1 | 10/2005 | Wu et al. |
| 2005/0251771 A1 | 11/2005 | Robles |
| 2005/0268256 A1 | 12/2005 | Tsai et al. |
| 2006/0084261 A1 | 4/2006 | Iwaki |
| 2006/0101370 A1 | 5/2006 | Cui et al. |
| 2006/0112355 A1 | 5/2006 | Pileggi et al. ................. 716/1 |
| 2006/0121715 A1 | 6/2006 | Chang et al. |
| 2006/0125024 A1 | 6/2006 | Ishigaki |
| 2006/0151810 A1 | 7/2006 | Ohshige ................. 257/207 |
| 2006/0181310 A1 | 8/2006 | Rhee |
| 2006/0197557 A1 | 9/2006 | Chung |
| 2006/0206854 A1 | 9/2006 | Barnes et al. |
| 2006/0223302 A1 | 10/2006 | Chang et al. |
| 2007/0038973 A1 | 2/2007 | Li et al. |
| 2007/0074145 A1 | 3/2007 | Tanaka |
| 2007/0101305 A1 | 5/2007 | Smith et al. |
| 2007/0106971 A1* | 5/2007 | Lien et al. ................ 716/13 |
| 2007/0113216 A1* | 5/2007 | Zhang ................... 716/17 |
| 2007/0209029 A1 | 9/2007 | Ivonin et al. |
| 2007/0234252 A1 | 10/2007 | Visweswariah et al. |
| 2007/0256039 A1 | 11/2007 | White |
| 2007/0274140 A1 | 11/2007 | Joshi et al. |
| 2008/0005712 A1 | 1/2008 | Charlebois et al. |
| 2008/0046846 A1 | 2/2008 | Chew et al. |
| 2008/0098334 A1 | 4/2008 | Pileggi et al. |
| 2008/0127029 A1 | 5/2008 | Graur et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0276105 A1 | 11/2008 | Hoberman et al. |
| 2009/0024974 A1 | 1/2009 | Yamada |
| 2009/0077524 A1 | 3/2009 | Nagamura |
| 2009/0106714 A1 | 4/2009 | Culp et al. |
| 2009/0228853 A1 | 9/2009 | Hong et al. |
| 2010/0019308 A1 | 1/2010 | Chan et al. |

FOREIGN PATENT DOCUMENTS

| | | |
|---|---|---|
| KR | 10-1999-0057943 A | 7/1999 |
| KR | 10-2000-0028830 A | 5/2000 |
| KR | 10-2005-0030347 A | 3/2005 |
| WO | WO 2005/104356 | 11/2005 |
| WO | WO 2006/014849 | 2/2006 |
| WO | WO 2006/052738 | 5/2006 |

OTHER PUBLICATIONS

Amazawa, et al., "Fully Planarized Four-Level Interconnection with Stacked VLAS Using CMP of Selective CVD-A1 and Insulator and its Application to Quarter Micron Gate Array LSIs", 1995, IEEE, Japan, pp. 473-476.

Burkhardt, et al., "Dark Field Double Dipole Lithography (DDL) for Back-End-of-Line Processes", 2007, SPIE Proceeding Series, vol. 6520; 65200K.

Capetti, et al., "Sub k1=0.25 Lithography with Double Patterning Technique for 45nm Technology Node Flash Memory Devices at λ=193nm", 2007, SPIE Proceeding Series, vol. 6520; 65202K.

Chandra, et al., "An Interconnect Channel Design Methodology for High Performance Integrated Circuits", 2004, IEEE, Carnegie Mellon University, pp. 1-6.

Cheng, et al., "Feasibility Study of Splitting Pitch Technology on 45nm Contact Paterning with 0.93 NA", 2007, SPIE Proceeding Series, vol. 6520; 65202N.

Chow, et al., "The Design of a SRAM-Based Field-Programmable Gate Array—Part II: Circuit Design and Layout", 1999, IEEE, vol. 7 # 3 pp. 321-330.

DeVor, et al., "Statistical Quality Design and Control", 1992, Macmillan Publishing Company, pp. 264-267.

Dusa, et al. "Pitch Doubling Through Dual Patterning Lithography Challenges in Integration and Litho Budgets", 2007, SPIE Proceeding Series, vol. 6520; 65200G.

El-Gamal, "Fast, Cheap and Under Control: The Next Implementation Fabric", Jun. 2-6, 2003, ACM Press, pp. 354-355.

Frankel, "Quantum State Control Interference Lithography and Trim Double Patterning for 32-16mn Lithography", 2007, SPIE Proceeding Series, vol. 6520; 65202L.

Hayashida, et al., "Manufactuable Local Interconnect technology Fully Compatible with Titanium Salicide Process", Jun. 11-12, 1991, VMIC Conference.

Heng, et al., "A VLSI Artwork Legalization Technique Base on a New Criterion of Minimum Layout Perturbation", 1997, ACM Press, pp. 116-121.

Hu, et al., "Synthesis and Placemant Flow for Gain-Based Programmable Regular Fabrics", Apr. 6-9, 2003, ACM Press, pp. 197-203.

Hutton, et al., "A Methodology for FPGA to Structured-ASIC Synthesis and Verification", 2006, EDAA, pp. 64-69.

Jayakumar, et al., "A Metal and VIA Maskset Programmable VLSI Design Methodology using PLAs", 2004, IEEE, pp. 590-594.

Kheterpal, et al., "Routing Architecture Exploration for Regular Fabrics", DAC, Jun. 7-11, 2004, ACM Press, pp. 204-207.

Kheterpal, et al., "Design Methodlgy for IC Manufactrability Based on Regular Logic-Bricks", DAC, Jun. 13-17, 2005, IEEE/AMC, vol. 6520.

Kim, et al., "Issues and Challenges of Double Patterning Lithography in DRAM", 2007, SPIE Proceeding Series, vol. 6520; 65200H.

Kim, et al., "Double Exposure Using 193nm Negative Tone Photoresist", 2007, SPIE Proceeding Series, vol. 6520; 65202M.

Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 2003, Springer-Verlag, vol. 2778, pp. 426-436.

Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2002, Springer-Verlag, vol. 2438 pp. 132-141.

Koorapaty, et al., "Exploring Logic Block Granularity for Regular Fabrics", 2004, IEEE, pp. 1-6.

Li, et al., "A Linear-Centric Modeling Approach to Harmonic Balance Analysis", 2002, IEEE, pp. 1-6.

Li, et al., "Nonlinear Distortion Analysis Via Linear-Centric Models", 2003, IEEE, pp. 897-903.

Liebmann et al., "Integrating DfM Components Into a Cohesive Design-to-Silicon Solution", IBM Systems and Technology Group, b IBM Research, pp. 1-12.

Liebmann, et al., "High-Performance Circuit Design for the RET-Enabled 65nm Technology Node", Feb. 26-27, 2004, SPIE Proceeding Series, vol. 5379 pp. 20-29.

Liu, et al., "Double Patterning with Multilayer Hard Mask Shrinkage for Sub-0.25 k1 Lithography", 200, SPIE Proceeding Series, vol. 6520; 65202J.

Mo, et al., "Checkerboard: A Regular Structure and its Synthesis, International Workshop on Logic and Synthesis", 2003, Department of Electrical Engineering and Computer Sciences, UC Berkeley, California, pp. 1-7.

Mo, et al., "PLA-Based Regular Structures and Their Synthesis", 2003, Department of Electrical Engineering and Computer Sciences, IEEE, pp. 723-729.

Mo, et al., "Regular Farbrics in Deep Sub-Micron Integrated-Circuit Design", 2004, Kluwer Academic Publishers, Entire Book.

Op de Beek, et al., "Manufacturability issues with Double Patterning for 50nm half pitch damscene applications, using RELACS® shrink and corresponding OPC", 2007, SPIE Proceeding Series, vol. 6520; 65200I.

Or-Bach, "Programmable Circuit Fabrics", Sep. 18, 2001, e-ASIC, pp. 1-36.

Otten, et al., "Planning for Performance", DAC 1998, ACM Inc., pp. 122-127.

Pandini, et al., "Congestion-Aware Logic Synthesis", 2002, IEEE, pp. 1-8.

Pandini, et al., "Understanding and Addressing the Impact of Wiring Congestion During Technology Mapping", ISPD Apr. 7-10, 2002, ACM Press, pp. 131-136.

Patel, et al., "An Architectural Exploration of Via Patterned Gate Arrays, ISPD 2003", Apr. 6, 2003, pp. 184-189.

Pileggi, et al., "Exploring Regular Fabrics to Optimize the Performance-Cost Trade-Offs, Proceedings of the 40th ACM/IEEE Design Automation Conference (DAC) 2003", Jun. 2003, ACM Press, pp. 782-787.

Poonawala, et al., "ILT for Double Exposure Lithography with Conventional and Novel Materials", 2007, SPIE Proceeding Series, vol. 6520; 65202Q.

Ran, et al., "Designing a Via-Configurable Regular Fabric", Custom Integrated Circuits Coference (CICC). Proceedings of the IEEE, Oct. 1, 2004, pp. 423-426.

Ran, et al., "On Designing Via-Configurable Cell Blocks for Regular Fabrics" Proceedings of the Design Automation Conference (DAC), Jun. 2004, ACM Press, s 198-203.

Ran, et al., "An Integrated Design Flow for a Via-Configurable Gate Array", 2004, IEEE, pp. 582-589.

Ran, et al., "Via-Configurable Routing Architectures and Fast Design Mappability Estimation for Regular Fabrics", 2005, IEEE, pp. 25-32.

Ran, et al., "The Magic of a Via-Configurable Regular Fabric", Proceedings of the IEEE International Conference on Computer Design (ICCD) Oct. 2004.

Reis, et al., "Physical Design Methodologies for Performance Predictability and Manufacturability", Apr. 14-16, 2004, ACM Press, pp. 390-397.

Robertson, et al., "The Modeling of Double Patterning Lithographic Processes", 2007, SPIE Proceeding Series, vol. 6520; 65200J.

Rovner, "Design for Manufacturability in Via Programmable Gate Arrays", May 2003, Graduate School of Cagegie Mellon University.

Sengupta, "An Integrated CAD Framework Linking VLSI Layout Editors and Process Simulators", 1998, Thesis for Rice University, pp. 1-101.

Sengupta, et al., "An Integrated CAD Framework Linking VLSI Layout Editors and Process Simulators", 1996, SPIE Proceeding Series, vol. 2726; pp. 244-252.

Sherlekar, "Design Considerations for Regular Fabrics", Apr. 18-21, 2004, ACM Press, pp. 97-102.

Stapper, "Modeling of Defects in Integrated Circuit Photolithographic Patterns", Jul. 1, 1984, IBM, vol. 28 # 4, pp. 461-475.

Taylor, et al., "Enabling Energy Efficiency in Via-Patterned Gate Array Devices", Jun. 7-11, 2004, ACM Press, pp. 874-877.

Tong, et al., "Regular Logic Fabrics for a Via Patterned Gate Array (VPGA), Custom Integrated Circuits Conference", Sep. 2003, Proceedings of the IEEE, pp. 53-56.

Vanleehgove, et al., "A Litho-Only Approach to Double Patterning", 2007, SPIE Proceeding Series, vol. 6520; 65202F.

Wenren, et al., "The Improvement of Photolithographic Fidelity of Two-dimensional Structures Though Double Exposure Method", 2007, SPIE Proceeding Series, vol. 6520; 65202I.

Wilcox, et al., "Design for Manufacturability: A Key to Semiconductor Manufacturing Excellence", 1998, IEEE, pp. 308-313.

Wu, et al., "A Study of Process Window Capabilities for Two-dimensional Structures under Double Exposure Condition", 2007, SPIE Proceeding Series, vol. 6520; 65202O.

Xiong, et al., "The Constrained Via Minimization Problem for PCB and VLSI Design", 1988, ACM Press/IEEE, pp. 573-578.

Yamamaoto, et al., "New Double Exposure Technique without Alternating Phase Shift Mask", 2007, SPIE Proceeding Series, vol. 6520; 652052P.

Yang, et al., "Interconnection Driven VLSI Module Placement Based on Quadratic Programming and Considering Congestion Using LFF Principles", 2004, IEEE, pp. 1243-1247.

Yao, et al., "Multilevel Routing With Redundant Via Insertion", Oct. 2006, IEEE, pp. 1148-1152.

Zheng, et al."Modeling and Analysis of Regular Symmetrically Structured Power/Ground Distribution Networks", DAC, Jun. 10-14, 2002, ACM Press, pp. 395-398.

Zhu, et al., "A Study of Double Exposure Process Design with Balanced Performance Parameters for Line/Space Applications", 2007, SPIE Proceeding Series, vol. 6520; 65202H.

Zuchowski, et al., "A Hybrid ASIC and FPGA Architecture", 2003, IEEE, pp. 187-194.

U.S. Appl. No. 60/625,342, filed May 25, 2006, Pileggi et al.

Wang, J. et al., Statndard Cell Layout with Regular Contact Placement, IEEE Trans. on Semicon. Mfg., vol. 17, No. 3, Aug. 2004.

Kang, S.M., Metal-Metal Matrix (M3) for High-Speed MOS VLSI Layout, IEEE Trans. on CAD, vol. CAD-6, No. 5, Sep. 1987.

Liebmann, L. W., Layout Impact of Resolution Enhancement Techniques: Impediment or Opportunity?, International Symposium on Physical Design, 2003.

Jhaveri, T. et al., Maximization of Layout Printability/Manufacturability by Extreme Layout Modularity, Proc. of the SPIE, Apr. 2006.

Axelrad et al. "Efficient Full-Chip Yield Analysis Methodology for OPC-Corrected VLSI Design", 2000, International Symposium on Quality Electronic Design (ISQED).

Balasinski et al. "Impact of Subwavelength CD Tolerance on Device Performance", 2002, SPIE.

Clark et al. "Managing Standby and Active Mode Leakage Power in Deep Sub-Micron Design", Aug. 9-11, 2004, ACM.

Cobb et al. "Using OPC to Optimize for Image Slope and Improve Process Window", 2003, SPIE.

Devgan "Leakage Issues in IC Design: Part 3", 2003, CCAD.

Garg, et al. "Lithography Driven Layout Design", 2005, IEEE.

Grobman et al. "Reticle Enhancement Technology Trends: Resource and Manufacturability Implications for the Implementation of Physical Designs" Apr. 1-4, 2001, ACM.

Grobman et al. "Reticle Enhancement Technology: Implications and Challenges for Physical Design" Jun. 18-22, 2001, ACM.

Gupta et al. "Enhanced Resist and Etch CD Control by Design Perturbation", Oct. 4-7, 2006, Society of Photo-Optical Instrumentation Engineers.

Gupta et al. "A Practical Transistor-Level Dual Threshold Voltage Assignment Methodology", 2005, Sixth International Symposium on Quality Electronic Design (ISQED).

Gupta et al. "Detailed Placement for Improved Depth of Focus and CD Control", 2005, ACM.

Gupta et al. "Joining the Design and Mask Flows for Better and Cheaper Masks", Oct. 14-17, 2004, Society of Photo-Optical Instrumentation Engineers.

Gupta et al. "Selective Gate-Length Biasing for Cost-Effective Runtime Leakage Control", Jun. 7-11, 2004, ACM.

Gupta et al. "Wafer Topography-Aware Optical Proximity Correction for Better DOF Margin and CD Control", Apr. 13-15, 2005, SPIE.

Heng, et al., "Toward Through-Process Layout Quality Metrics", Mar. 3-4, 2005, Society of Photo-Optical Instrumentation Engineers.

Intel Core Microarchitecture White Paper "Introducing the 45 nm Next-Generation Intel Core Microarchitecture," 2007, Intel Corporation.

Lavin et al. "Backend DAC Flows for "Restrictive Design Rules"", 2004, IEEE.

Miller, "Manufacturing-Aware Design Helps Boost IC Yield", Sep. 9, 2004, http://www.eetimes.com/showArticle.jhtml?articleID=47102054.

Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.

Mutoh et al. "1-V Power Supply High-Speed Digital Circuit Technology with Multithreshold-Voltage CMOS", 1995, IEEE.

Pack et al. "Physical & Timing Verification of Subwavelength-Scale Designs—Part I: Lithography Impact on MOSFETs", 2003, SPIE.

Qian et al. "Advanced Physical Models for Mask Data Verification and Impacts on Physical Layout Synthesis" 2003. IEEE.

Sreedhar et al. "Statistical Yield Modeling for Sub-Wavelength Lithography", 2008, IEEE.

Tian et al. "Model-Based Dummy Feature Placement for Oxide Chemical_Mechanical Polishing Manufacturability" 2000, ACM.

Wang, et al., "Performance Optimization for Gridded-Layout Standard Cells", 2004, vol. 5567 SPIE.

Webb, Clair, "Layout Rule Trends and Affect upon CPU Design", 2006, vol. 6156 SPIE.

Webb, Clair, "45nm Design for Manufacturing," Intel Technology Journal, vol. 12, Issue 02, Jun. 17, 2008, ISSN 1535-864X, pp. 121-130.

Zhu, et al., "A Stochastic Integral Equation Method for Modeling the Rough Surface Effect on Interconnect Capacitance", 2004, IEEE.

\* cited by examiner

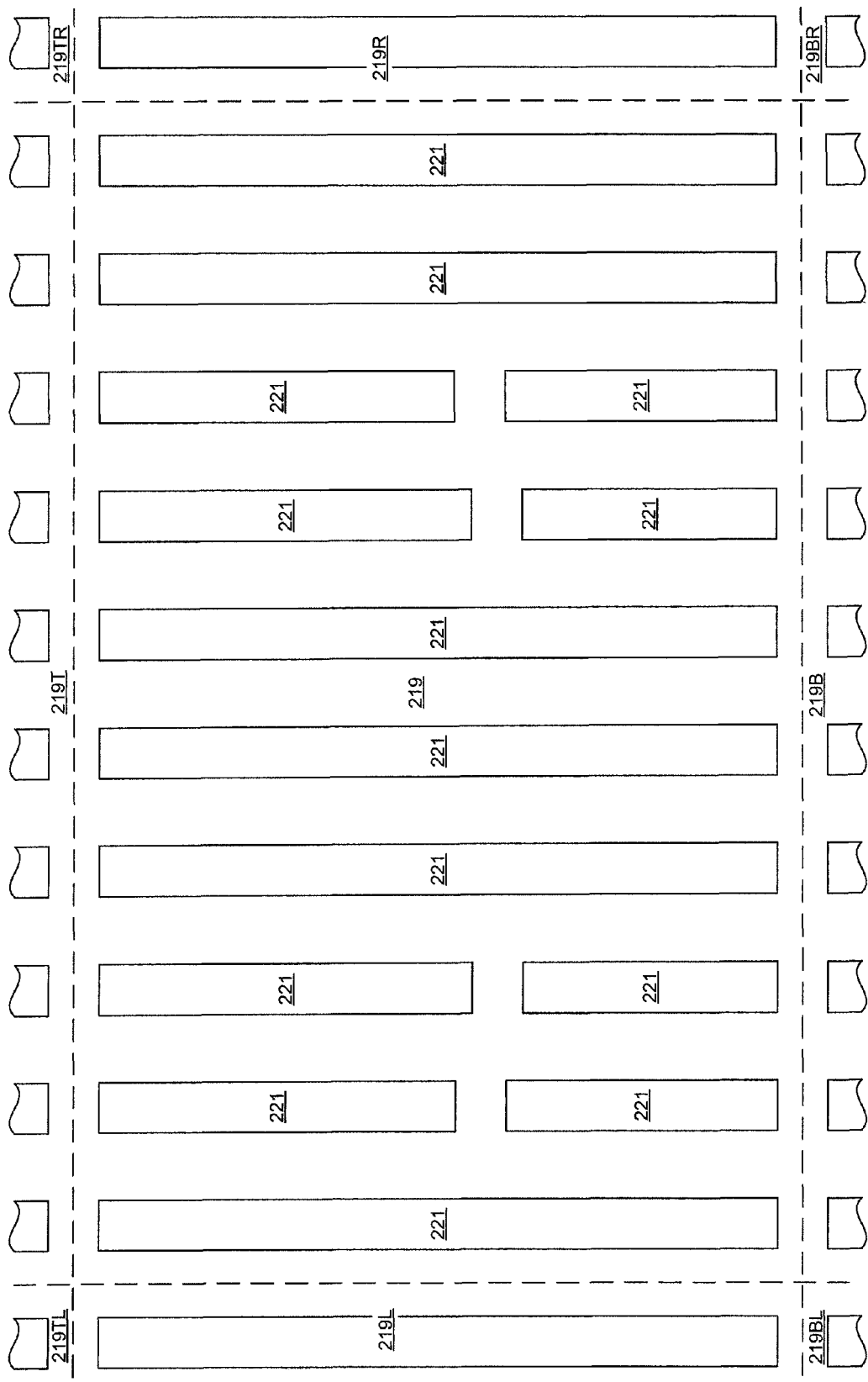

US 7,979,829 B2

INTEGRATED CIRCUIT CELL LIBRARY WITH CELL-LEVEL PROCESS COMPENSATION TECHNIQUE (PCT) APPLICATION AND ASSOCIATED METHODS

CLAIM OF PRIORITY

This application claims priority under 35 U.S.C. 119(e) to U.S. Provisional Patent Application No. 60/890,819, filed Feb. 20, 2007, entitled "IC Cell Library with Pre-OPC/RET and Extra Layers for Design and Verification." The disclosure of the above-identified provisional patent application is incorporated herein by reference.

CROSS-REFERENCE TO RELATED APPLICATIONS

This application is also related to U.S. patent application Ser. No. 11/683,402, filed on Mar. 7, 2007, and entitled "Dynamic Array Architecture." This application is also related to U.S. patent application Ser. No. 12/013,342, filed on Jan. 11, 2008, and entitled "Semiconductor Device with Dynamic Array Section." This application is also related to U.S. patent application Ser. No. 12/013,356, filed on Jan. 11, 2008, and entitled "Methods for Designing Semiconductor Device with Dynamic Array Section." This application is also related to U.S. patent application Ser. No. 12/013,366, filed on Jan. 11, 2008, and entitled "Methods for Defining Dynamic Array Section with Manufacturing Assurance Halo and Apparatus Implementing the Same." The disclosures of the above-identified patent applications are incorporated herein by reference.

BACKGROUND

Current integrated circuit (IC) design flows are broken into several functions. Design teams typically focus on synthesis, place and route, layout versus schematic (LVS), timing closure, power closure, reliability closure, and design rule checking (DRC). The "GDS-II" database is signed off and released to a post-design processing team which applies various forms of RET (resolution enhancement techniques), mainly OPC (optical proximity correction). OPC is done on pre-defined masking layers, usually using lithographic models provided by the wafer fab. Each mask layer of the whole chip is run through OPC with the appropriate model, then released to the mask shop for fracturing and mask making.

In today's era of sub-wavelength photolithography, in which the feature sizes are smaller than the wavelength of the exposure light, the full-chip OPC creates patterns for the masks which are difficult to validate for correctness. A number of electronic design automation (EDA) tools are trying to perform "hot spot" checks or design rule checking (DRC) on the full-chip post-OPC databases. Sheer data volumes make this difficult, as the post-OPC databases can be 20 to 100 times larger than the original layout. Therefore, full-chip OPC can be extremely expensive in terms of cost and schedule. Also, OPC done on the full chip at this phase of the design flow is in the critical path for getting the database to the mask shop. Additionally, complete circuit checking after full-chip OPC (prior to fabrication) is difficult if not impossible. Therefore, some problems cannot be identified until the design is fabricated on wafer, thereby resulting in significant financial and time-to-market risk.

As part of the timing closure, extraction tools combine the full-chip layout information based on idealized polygon shapes with a wafer fab technology file to add parasitic components to the circuit schematic. Since the as-fabricated features on the wafer do not exactly match the idealized polygon shapes defined in the layout, geometric dependent parasitics like resistances and capacitances are less accurate than may be needed, thereby creating a potential for error in timing analysis.

SUMMARY

In one embodiment, a method is disclosed for designing an integrated circuit. The method includes an operation for generating a layout of one or more cells to satisfy a netlist of the integrated circuit. Cell-level process compensation technique (PCT) processing is performed on a number of levels of one or more cells in the layout to generate a PCT processed version of the one or more cells in the layout. The method also includes generating an as-fabricated aerial image of the PCT processed levels of the one or more cells to facilitate evaluation of PCT processing adequacy. Cell-level circuit extraction is performed on the PCT processed version of the one or more cells using the generated as-fabricated aerial images. The cell-level PCT processing and cell-level circuit extraction are performed before placing and routing of the layout on a chip.

In another embodiment, a method is disclosed for performing cell-level PCT processing. The method includes an operation for selecting a cell to be PCT processed. A lithographic buffer region is defined around a level of the selected cell. PCT processing is performed on the level of the cell surrounded by the lithographic buffer region. An as-fabricated aerial image of the PCT processed level of the cell is generated. Edge differentials are measured between as-fabricated features in the aerial image and corresponding features in a layout of the cell level to ensure adequacy of the PCT processing. Upon adequate PCT processing, the PCT processed cell level and corresponding as-fabricated aerial image are stored on a computer readable storage medium.

In another embodiment, a method is disclosed for analyzing a transistor. The method includes an operation for generating a simulated aerial image of an as-fabricated active region of a transistor. An operation is then performed to delineate differentiated active region areas along each side of a gate electrode of the transistor based on the simulated aerial image of the as-fabricated active region. The transistor is then virtually sliced into segments based on the delineation of differentiated active region areas along each side of the gate electrode of the transistor. The method further includes an operation for storing each transistor segment in a computer readable format suitable for processing by a circuit analysis tool.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 2E is an illustration showing a layout of a gate level of a cell prior to cell-level-PCT processing, in accordance with one embodiment of the present invention;

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

As used herein, a process compensation technique (PCT) refers to essentially any processing or adjustment of an integrated circuit (IC) layout for the purpose of improving or ensuring successful fabrication of the features defined by the IC layout. Examples of various PCTs include optical proximity correction (OPC), resolution enhancement techniques (RET), etch proximity compensation, gap fill compensation (e.g., use of dielectric or metal to fill gaps), chemical mechanical planarization (CMP) compensation, among others. It should be understood that the term PCT processing, as used herein, refers to any existing or future form of IC layout processing used to improve or ensure successful fabrication of features defined by the IC layout.

Figure 1A:
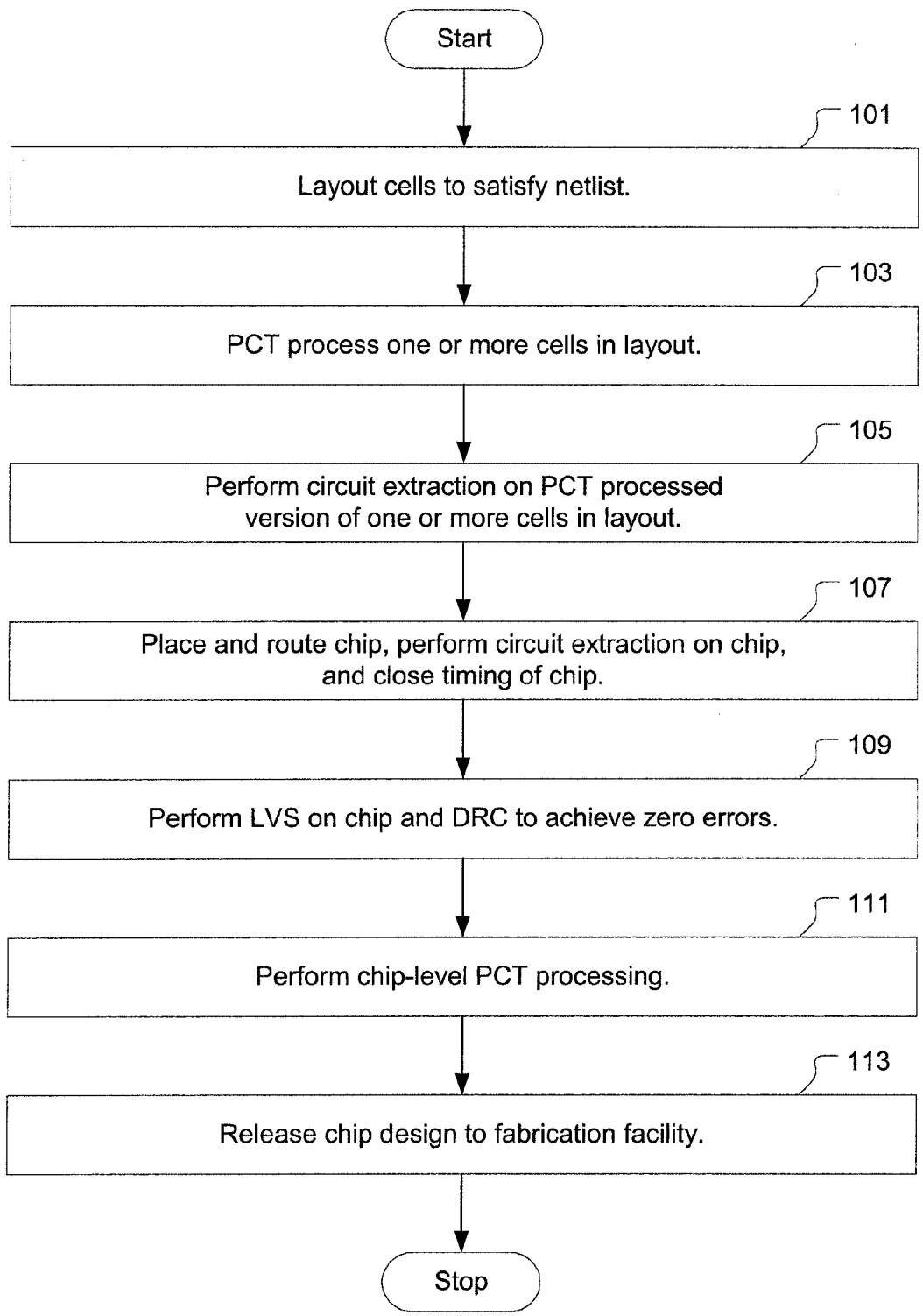
FIG. 1A is an illustration showing a flowchart of a method for designing an integrated circuit for fabrication, in accordance with one embodiment of the present invention.

FIG. 1A is an illustration showing a flowchart of a method for designing an integrated circuit for fabrication, in accordance with one embodiment of the present invention. The method includes an operation 101 for laying out cells to satisfy a netlist of the integrated circuit. The netlist represents a nodal description of devices in the circuit, such as transistors and their associated connections and terminals. Each cell represents an abstraction of a logic function in the netlist, and encapsulates the lower-level integrated circuit layout for implementing the logic function.

It should be understood that a given logic function can be represented by multiple cell variations, wherein the cell variations may be differentiated by feature size, performance, and process compensation technique (PCT) processing. For example, multiple cell variations for a given logic function may be differentiated by power consumption, signal timing, current leakage, chip area, OPC, RET, etc. It should also be understood that each cell description includes the layouts for the cell in each level of the chip, as required to implement the logic function of the cell. More specifically, a cell description includes layouts for the cell in each level of the chip extending from the substrate level up through a particular interconnect level.

Once the cell layout is completed in operation 101, the method proceeds with an operation 103 for performing PCT processing on a number of levels of one or more cells used in the layout. Operation 103 is referred to herein as cell-level-PCT processing. In one embodiment, operation 103 is performed on each level of each unique cell in the layout. However, in another embodiment, operation 103 is performed on selected levels of selected cells in the layout.

Figure 1B:
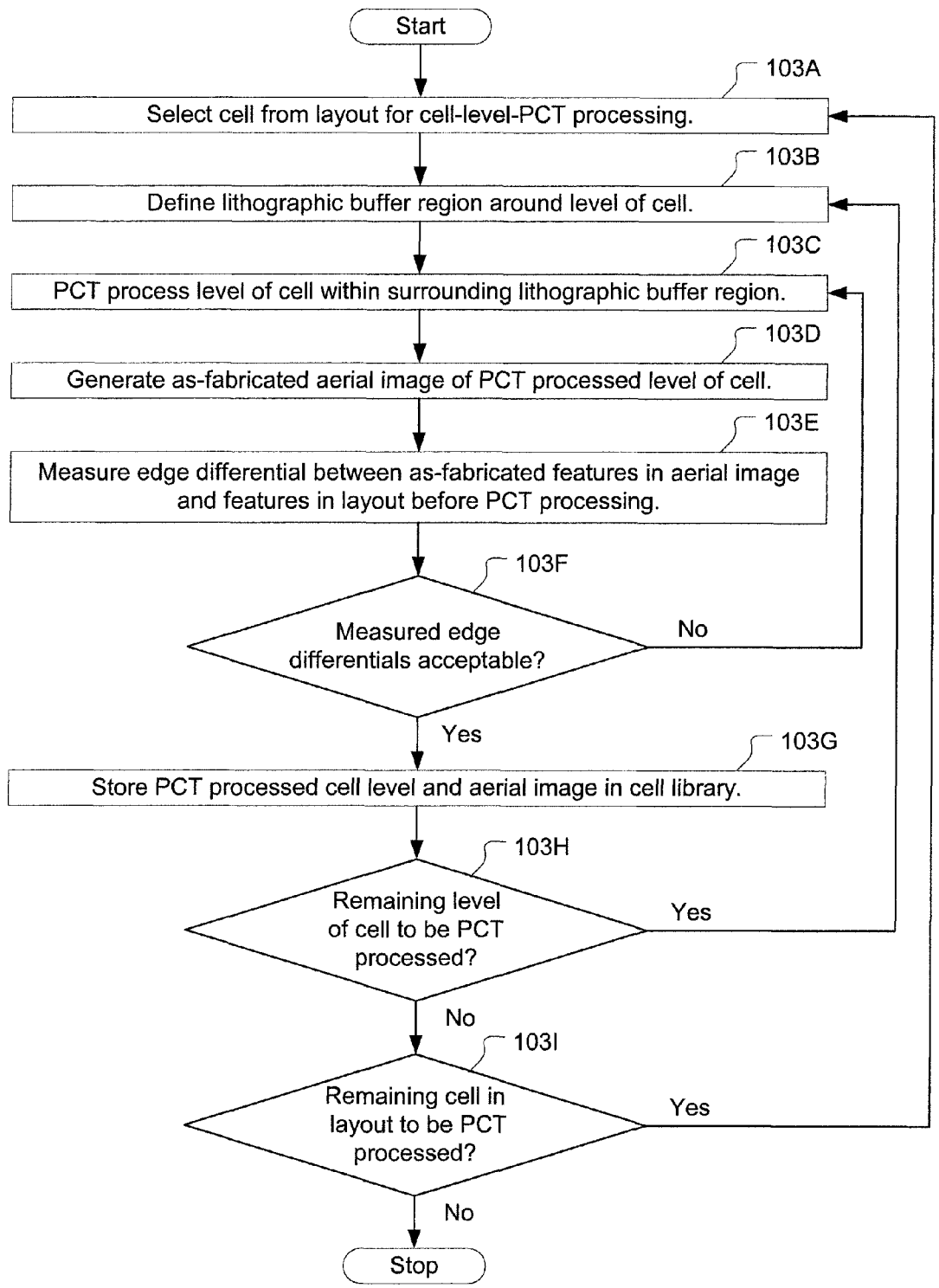
FIG. 1B is an illustration showing a flowchart of a method for PCT processing cells in a circuit layout, in accordance with one embodiment of the present invention.

FIG. 1B is an illustration showing a flowchart of a method for performing operation 103 of FIG. 1A, in accordance with one embodiment of the present invention. In an operation 103A, a cell is selected from the layout for cell-level-PCT processing. It should be appreciated that the cell-level-PCT processing is performed without explicit consideration of the chip as a whole. However, in performing the cell-level-PCT processing on a given cell, a lithographic buffer region ("litho-buffer" hereafter) is defined around each level of the cell to simulate a chip environment in which the cell may be placed. To this end, the method of FIG. 1B continues with an operation 103B to define a lithographic buffer region ("litho-buffer" hereafter) around a level of the cell selected in operation 103A.

Figure 2A:
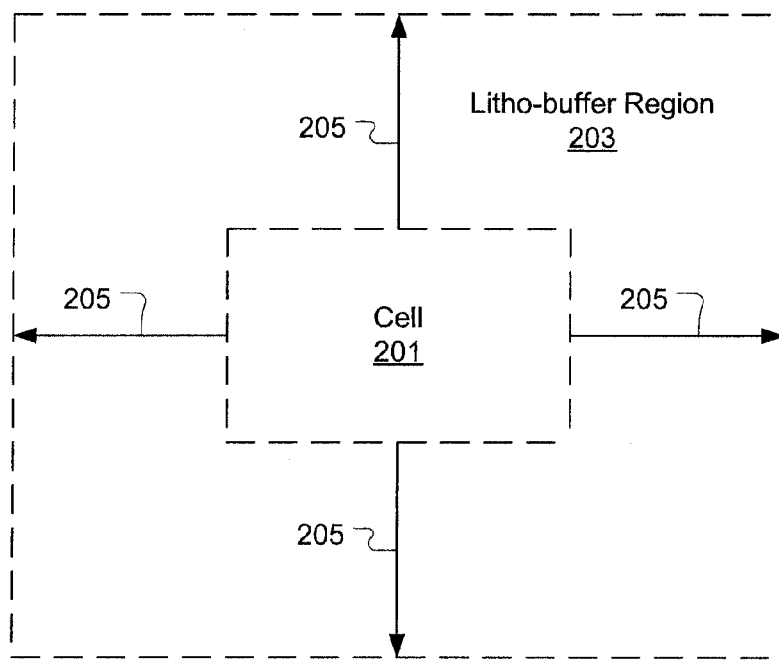
FIG. 2A is an illustration showing an exemplary cell surrounded by a litho-buffer, in accordance with one embodiment of the present invention.

FIG. 2A is an illustration showing an exemplary cell 201 surrounded by a litho-buffer 203, in accordance with one embodiment of the present invention. Generally speaking, the litho-buffer associated with a given level of the cell is defined to include a number of features that simulate the neighborhood in which the cell will be placed on the chip. The size of the litho-buffer for a given level of the cell is defined by the outward extent of the litho-buffer from the cell. The size of the litho-buffer for a given level of the cell is set such that the litho-buffer covers an area capable of lithographically influencing the given level of the cell. For example, with regard to FIG. 2A, the size of the litho-buffer 203 is defined by its outward extent from the cell 201, as indicated by arrows 205.

In one embodiment, the outward extent of the litho-buffer can vary on different sides of the cell. In another embodiment, the outward extent of the litho-buffer is the same on each side of the cell. In one embodiment, the litho-buffer for a given level of the cell is defined to extend about 1 micrometer outward from each side of the cell. It should be understood that litho-buffers of different size can be used in different embodiments. Also, litho-buffers of different size can be used for different levels of the same cell. However, in one embodiment, a single litho-buffer size is used for each level of the same cell.

Figure 2B:
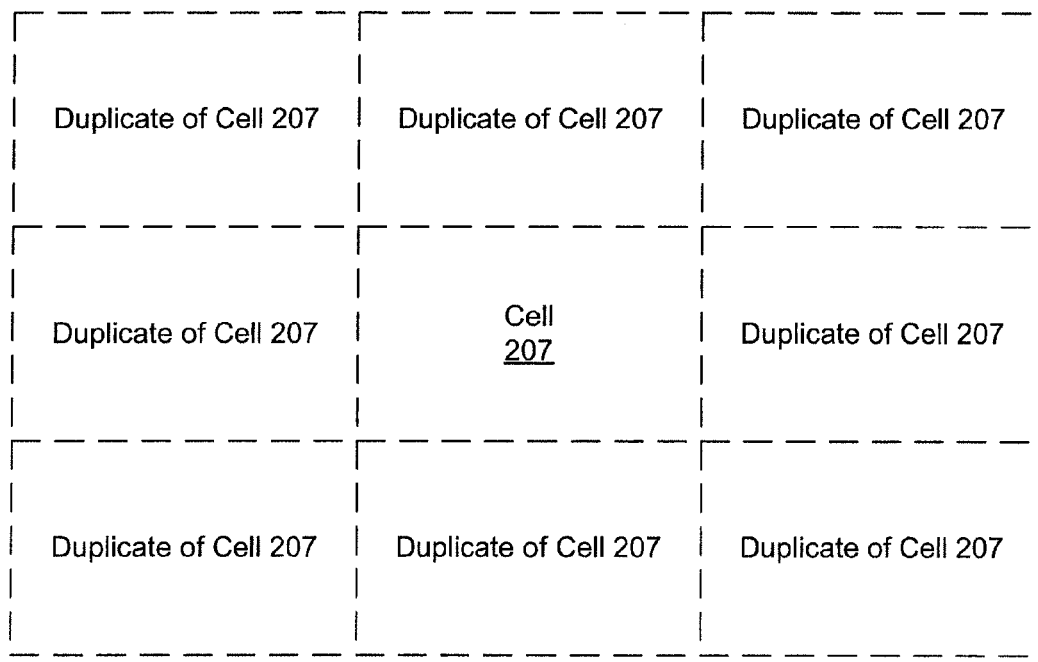
FIG. 2B is an illustration showing a cell surrounded by duplicate instantiations of itself to form a litho-buffer, in accordance with one embodiment of the present invention.

In one embodiment, a cell of arbitrary architecture is included in the layout and is subjected to the cell-level-PCT processing of operation 103. It should be understood that the cell of arbitrary architecture is unrestricted with regard to layout shape and placement. In this embodiment, the litho-buffer for the cell of arbitrary architecture can be defined by surrounding the cell with duplicate instantiations of itself. In one embodiment, each duplicate instantiation of the cell is defined as a mirror image of the cell. In another embodiment, each duplicate instantiation of the cell is defined to have the same orientation as the cell. FIG. 2B is an illustration showing a cell 207 surrounded by duplicate instantiations of itself to form a litho-buffer, in accordance with one embodiment of the present invention. The cell-level-PCT processing of cell 207 considers lithographic influences on the cell 207 from the patterning of features in the surrounding litho-buffer.

In another embodiment, a cell of regular architecture is included in the layout and is subjected to the cell-level-PCT processing of operation 103. The regular architecture is defined by placement of linear features on a regular-spaced grid in each of a number of levels of the cell, such that the linear features in a given level of the cell are oriented to be substantially parallel with each other in their traversal direction across the cell. Also, in the regular architecture, prior to PCT processing, each linear feature is defined to be devoid of a substantial change in direction relative to its traversal direction across the cell. In one embodiment, a cell of regular architecture can be defined according to the dynamic array architecture as described in each of co-pending U.S. patent application Ser. Nos. 11/683,402; 12/013,342; 12/013,356; and 12/013,366, which are incorporated in their entirety herein by reference.

Figure 2C:
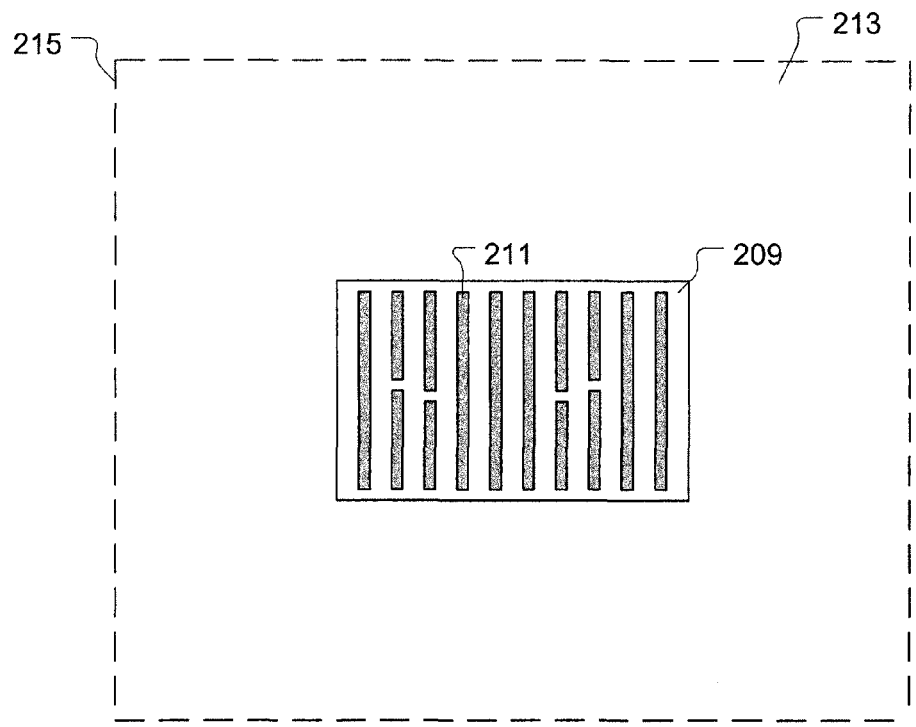
FIG. 2C is an illustration showing an exemplary layout of a level of a cell defined according to a regular architecture, in accordance with one embodiment of the present invention.

In one embodiment, the litho-buffer for the cell of regular architecture can be defined by surrounding the cell with duplicate instantiations of itself, in the manner described above with regard to FIG. 2B. However, in another embodiment, the litho-buffer for a given level of the cell of regular architecture can be defined in a more generalized manner to include a "blanket" of linear features which approximate those present in the level of the cell. FIG. 2C is an illustration showing an exemplary layout of a level of a cell 209 defined according to a regular architecture, in accordance with one embodiment of the present invention. The layout includes a number of linear features 211 placed according to a regular-spaced grid and oriented to be substantially parallel with each other in their traversal direction across the cell 209. Generally speaking, for a cell level of regular architecture, the litho-buffer can be defined by mirroring the regular-spaced grid used to define the level of the cell outward to fill the litho-buffer region. Then, the regular-spaced grid in the litho-buffer region can be populated by linear features oriented in the same direction and placed at substantially the same feature-to-feature spacing, i.e., feature pitch, as in the corresponding level of the cell, thereby populating the litho-buffer with the "blanket" of linear features which approximate those present in the level of the cell.

Figure 2D:
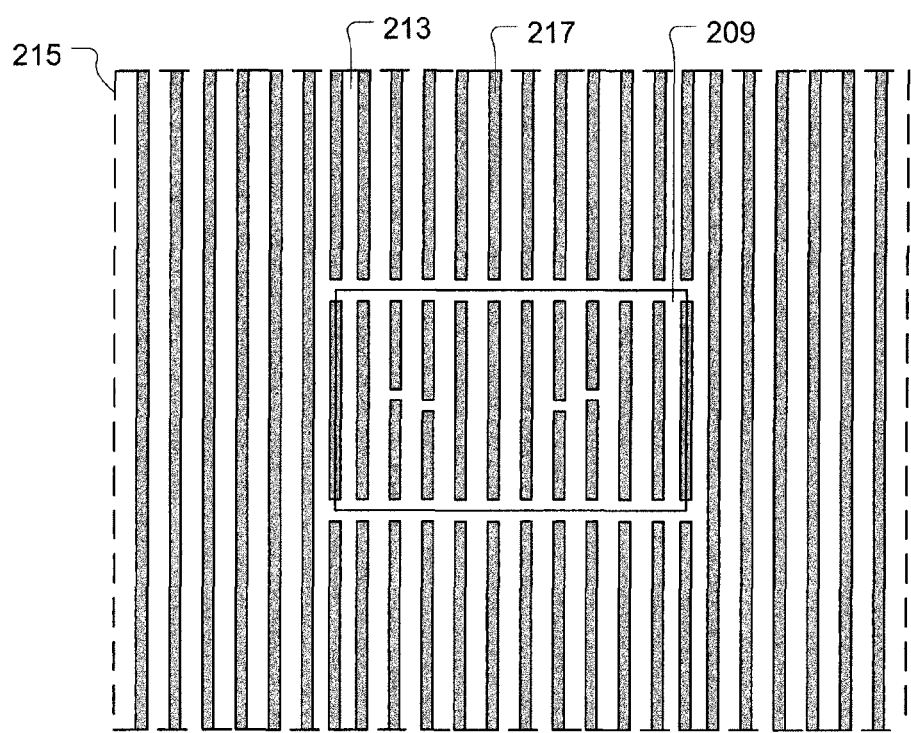
FIG. 2D is an illustration showing an exemplary litho-buffer region defined around the cell of FIG. 2C, in accordance with one embodiment of the present invention.

FIG. 2D is an illustration showing an exemplary litho-buffer region 213 defined around the cell 209 of FIG. 2C, in accordance with one embodiment of the present invention. The litho-buffer region 213 extends outward from the cell 209 to a litho-buffer boundary 215. The regular-spaced grid of cell 209 is mirrored outward from cell 209 to fill the litho-buffer region 213. Then, the regular-spaced grid in the litho-buffer region 213 is populated by linear features 217 oriented in the same direction and placed at substantially the same feature pitch as the features 211 in the corresponding level of the cell 209. Due to consideration of the linear features 217 in the litho-buffer region 213, the cell-level-PCT processing on cell 209 considers lithographic influences on the cell 209 from the patterning of surrounding features which may be present on the actual chip.

With reference back to FIG. 1B, following operation 103B, the method proceeds with an operation 103C to PCT process the level of the cell within the surrounding litho-buffer. During cell-level-PCT processing, features in the various level layouts of the cell are adjusted to include PCT shapes. The manner in which the PCT shapes are defined and placed can be specified/controlled through a set of PCT rules. The PCT corrections can vary in size, shape, and placement, depending on the particular cell architecture, i.e., layout shapes, sizes, and spacing. The PCT processed cell layouts can be put back into the cell database, i.e., cell library, or can be used to create a new cell database.

In a regular architecture that avoid bends in features defined above the active region, the PCT corrections are primarily intended to maintain the line width of each feature in critical regions. Therefore, with a cell of regular architecture, the PCT corrections can be relatively simple, such as one-dimensional corrections. For example, the critical dimension (CD) of the gate feature over the diffusion region, i.e., active region, would be important as it defines the transistor length. Whereas the CD of the gate feature over the field region, i.e., non-active region, is not as critical. Similarly, for interconnect features, the line width of the interconnect feature associated with a contact or a via is more important than the line width of the interconnect feature between connection points, i.e., between contacts or vias.

One advantage of the regular architecture is that line-end shortening and corner rounding are less of a concern than in an arbitrary architecture that includes many feature bends and corners, which can significantly complicate lithographic resolution. For example, in one embodiment of the regular architecture, diffusion areas have bends and require two-dimensional PCT corrections; however, the gate level layout, contact layout, via layout, and a number of interconnect level layouts include only linear shaped features that require only one-dimensional, i.e., linear, PCT corrections.

FIG. 2E is an illustration showing a layout of a gate level of a cell 219 prior to cell-level-PCT processing, in accordance with one embodiment of the present invention. The cell 219 is defined according to a regular architecture. Therefore, the gate level includes a number of linear features 221 having a common orientation and a regular feature-to-feature pitch. Also, the litho-buffer for the gate level is defined around cell 219 by duplicate instantiations of cell 219, namely cell 219TL, cell 219T, cell 219TR, cell 219R, cell 219BR, cell 219B, cell 219BL, and cell 219L.

Figure 2F:
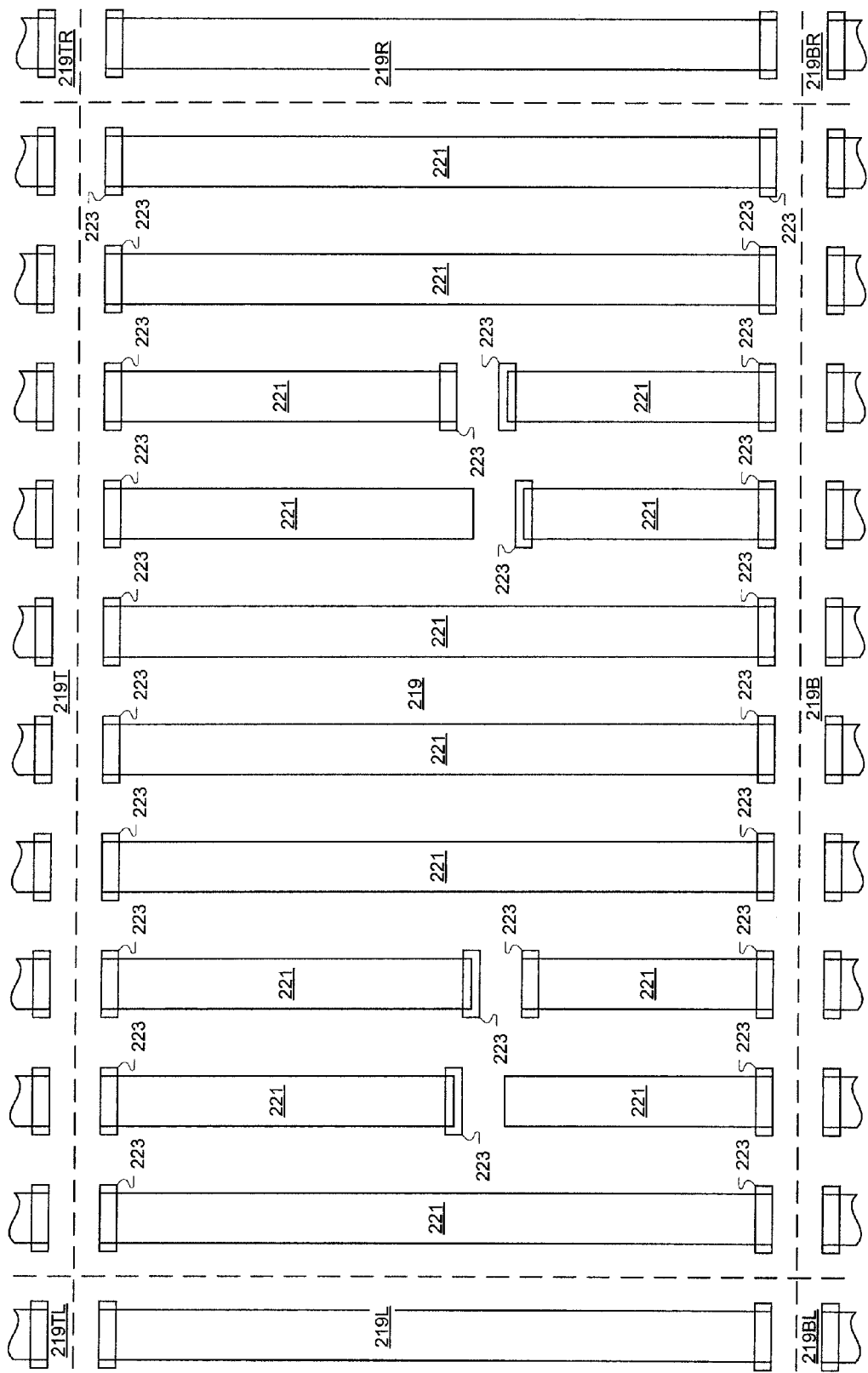
FIG. 2F is an illustration showing the gate level layout of cell with cell-level-PCT processing performed thereon, in accordance with one embodiment of the present invention.

FIG. 2F is an illustration showing the gate level layout of cell 219 with cell-level-PCT processing performed thereon, in accordance with one embodiment of the present invention. A number of PCT correction shapes 223 are placed at the ends of a number of the linear features 221 to combat line-end-rounding and line-end-shortening effects. As previously mentioned, because the gate level of cell 219 follows the regular architecture, the PCT correction shapes 223 are simple and one-dimensional, i.e., linear.

With reference back to FIG. 1B, following operation 103C, an operation 103D is performed to generate a simulation of the as-fabricated aerial image of the PCT processed cell level, which can be used as a basis for determining whether or not the PCT processing is adequate. For example, FIG. 2G is an illustration showing a simulated as-fabricated aerial image of the PCT processed gate level of cell 219 as shown in FIG. 2F, in accordance with one embodiment of the present invention.

Figure 2G:
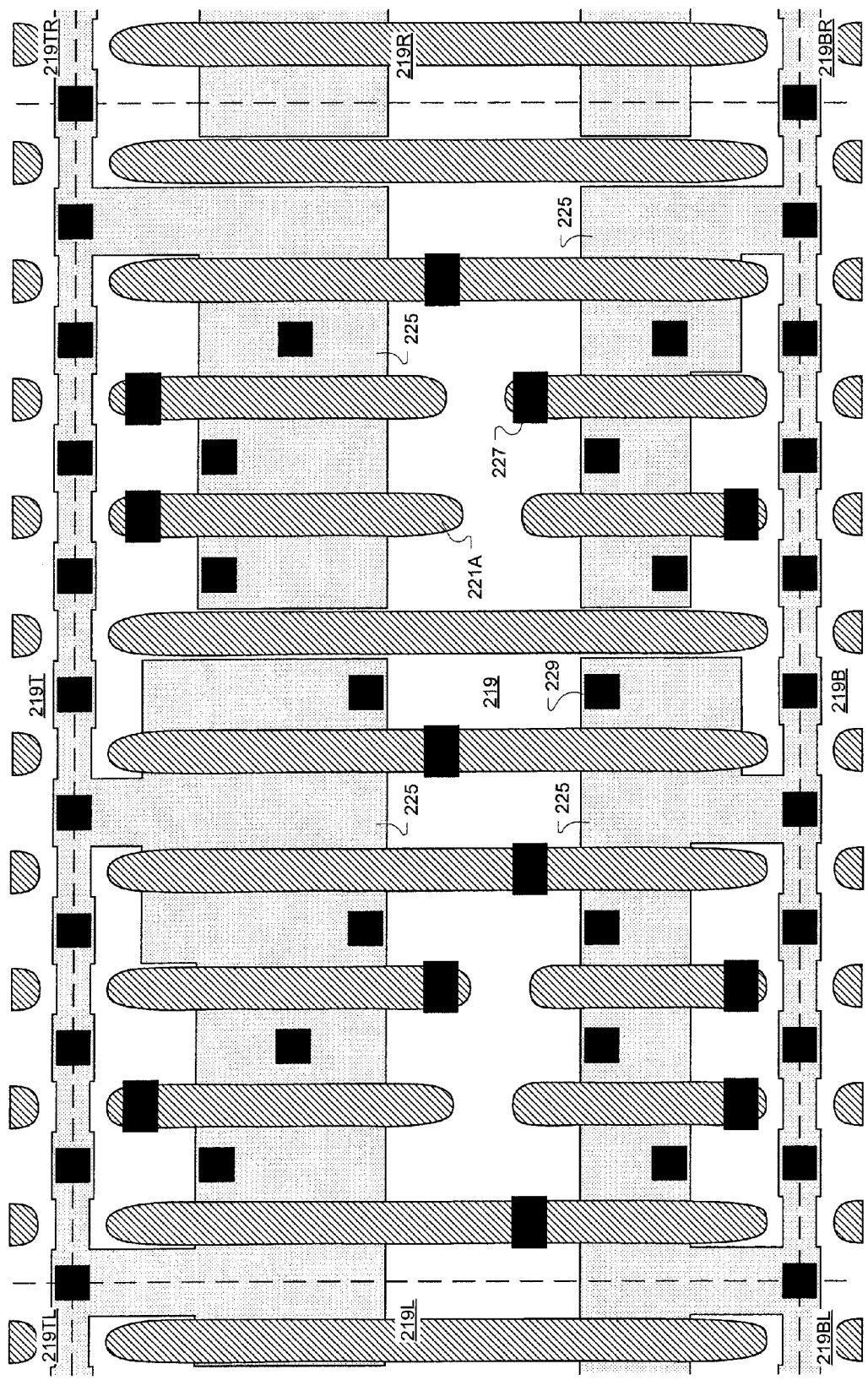
FIG. 2G is an illustration showing a simulated as-fabricated aerial image of the PCT processed gate level of cell as shown in FIG. 2F, in accordance with one embodiment of the present invention.

As shown in FIG. 2G, as-drawn portions of the layout for other cell levels such as diffusion regions 225 gate contacts 227, and diffusion contacts 229, can be displayed in the aerial image of the PCT processed gate level of cell 219 to enable determination of how well the as-fabricated gate features 221A are defined. In one embodiment, the as-fabricated aerial image of the cell level is generated using a tool designed to simulate how features of a given layout will appear, i.e., be shaped, when fabricated using specified processes and equipment at a particular semiconductor factory.

An operation 103E is performed to measure edge differentials between the feature contour edges in the as-fabricated aerial image simulation and the as-drawn layout feature edges. The as-drawn layout feature edges are represented by the original layout of the cell level prior to PCT processing. An operation 103F is then performed to determine whether the measured edge differentials of operation 103E are within acceptable limits. If the measured edge differentials are not acceptable, i.e., are too large, the method reverts back to operation 103C to further refine the PCT processing of the cell level. If the measured edge differentials are acceptable, the method continues with an operation 103G to store the final PCT processed version of the cell level and its as-fabricated aerial image to a cell library, which may be the original cell library or a new cell library.

The method then proceeds with an operation 103H to determine whether another level of the cell needs to be PCT processed. If another level of the cell remains to be PCT processed, the method reverts back to operation 103B to define a litho-buffer around a next level of the cell. If all levels of the cell have been PCT processed, the method continues with an operation 103I to determine whether another cell in the layout needs to be PCT processed. If another cell remains to be PCT processed, the method reverts back to operation 103A. If all cells have been successfully PCT processed, the method for performing operation 103 concludes.

Based on the foregoing, it should be understood that the cell-level-PCT processing of each level of each cell is performed in an iterative manner until an acceptable as-fabricated aerial image of the cell level is obtained based on measured edge differentials. Also, it should understood that operation 103 serves to generate a library of cells having been PCT processed and that includes the simulated as-fabricated aerial image of each PCT processed level of each cell.

With reference back to the method of FIG. 1A, following the operation 103, the method proceeds with an operation 105 for performing circuit extraction on the PCT processed version of the cells of the layout. Operation 105 is referred to herein as cell-level extraction. The cell-level extraction of a given cell can include explicit device extraction, parasitic device extraction, interconnect extraction, or any combination thereof. The cell-level extraction of a cell serves to generate a reverse annotated netlist of the cell for use in analysis. For example, cell-level extraction may generate a reverse annotated netlist of a cell for use in circuit simulation, static timing analysis, signal integrity analysis, power analysis, layout versus schematic analysis, design rule checking, or any combination thereof. Also, it should be understood that different types of cell-level extraction can be performed on a given cell to generate different types of reverse annotated netlists of the given cell for use in different types of cell analysis.

In one embodiment, the cell-level extraction of operation 105 is performed using the simulated as-fabricated aerial images of various levels of the cell, as generated during the PCT processing of operation 103. Cell-level extraction based on the simulated as-fabricated aerial images can improve local parasitic extraction accuracy. Also, cell-level extraction results for a given cell can be re-used for other instantiations of the given cell in the integrated circuit design. In one embodiment, cell-level extraction is performed using SPICE (Simulation Program with Integrated Circuit Emphasis) models. However, it should be understood that the cell-level extraction of operation 105 can be performed using essentially any type of tool capable of performing the required analysis. It should be appreciated that the cell-level-PCT processing of each cell, including cell-level aerial image generation and etch contour modeling, facilitates selection of an appropriate, i.e., most correct, tool to be used in the cell-level extraction process of operation 105. Also, because of new structure impacts to device performance (such as length-of-diffusion (LOD), diffusion overlapping of the gate electrode, and uniaxial strain induced by source/drain material differences (SiGe or SiC) or compressive/tensile over-layers) it is important to select the correct device model to perform the cell-level extraction.

From operation 105, the method proceeds with an operation 107 for performing chip-level place and route, chip-level circuit extraction, and chip-level timing closure. During the chip-level timing closure, if cells are swapped out to meet timing requirements, use of cells having pre-verified PCT processing performed thereon will reduce the need for layout adjustment later in the design flow, thereby reducing complexity and overall cost. Circuit extraction results obtained at the cell level are made available to the timing tool as it is doing the chip-level timing closure. Therefore, the chip-level timing closure can be done using more accurate data regarding the transistor performance.

Also, the more accurate representation of the transistor performance may illuminate excess design margin in the timing window, thereby providing an opportunity to optimize the design by reducing excess design margin. For example, the design may be optimizing more for power than timing when excess margin is identified in the timing window. Similarly, the cell-level extraction based on the as-fabricated aerial images of interconnect levels of the various cells, post PCT processing, can be used to provide better information on capacitances when performing the chip-level timing closure, thereby enabling possible design optimization where excess margin exists.

From operation 107, the method proceeds with an operation 109 for performing layout versus schematic (LVS) analysis and design rule checking (DRC) to achieve zero errors. Then, in an operation 111, chip-level PCT processing is performed. Interconnect levels of the various cells that required changing during the chip-level place and route process may require PCT processing at the chip level. However, in one embodiment, because the various cells were already PCT processed prior to chip-level place and route, the PCT processing required at the chip level may be limited to the interconnect levels, i.e., may not involve the device levels associated with the diffusion regions, gate contacts, diffusion contacts, or gate electrodes. It should be appreciated that focusing of chip-level PCT processing on interconnect levels should simplify chip-level PCT processing due to use of larger features sizes in the interconnect levels relative to the device levels.

In one embodiment, operation 111 can include chip-level PCT processing on both interconnect levels and on cell levels which were previously subjected to cell-level-PCT processing. For example, this embodiment may be applicable when there are cells in the design, such as input/output or analog cells, which have not been subjected to cell-level-PCT processing. It should be understood, however, that cells which have already been subjected to cell-level-PCT processing and already have a good PCT solution should be processed quickly during the chip-level-PCT processing of operation 111.

Following operation 111, design of the integrated circuit for fabrication is complete, and the method proceeds with an operation 113 for releasing the integrated circuit design to the fabrication facility. In one embodiment, the final circuit design is provided to the fabrication facility in the form of layout data files. Examples of layout data files include GDS II (Graphic Data System) database files and OASIS (Open Artwork System Interchange Standard) database files, among others.

For interconnect levels like metal 1 or metal 2, in which some tracks are used within the cell and some are filled later during block/chip route, the open interconnect level tracks are filled in the cell and litho-buffer when the litho-buffer is created. Then, after cell-level-PCT processing in operation 103 and cell-level extraction in operation 105, the fill lines are removed from the open interconnect tracks to enable normal chip-level routing in operation 107. Filling of the open interconnect tracks at the cell level allows the cell-level-PCT processing and cell-level extraction to be performed on a layout that is more representative of the final on-chip layout, thereby reducing the amount of chip-level PCT adjustment required in operation 111 and expediting the chip-level extraction and timing closure in operation 107.

It should be appreciated that in the method of FIG. 1A, the circuit designer is not disconnected from the PCT processing and the resulting fabrication effects on the circuit layout. Specifically, in the method of FIG. 1A, the designer is able to consider as-fabricated parasitics in the design closure, rather than simply relying on parasitics based on idealized polygon layouts. The as-fabricated parasitics are made available to the designer by generated aerial images of the layouts of the cells and providing those aerial images to the circuit extraction tool, thereby enabling more accurate circuit extraction and timing analysis. It should be understood that consideration of as-fabricated parasitics in the design closure cannot be done in the conventional design flow which does not have the aerial image information in the design environment.

The cell-level PCT processing results and associated as-fabricated aerial images can be placed in a cell library. Then, for a design that uses a cell which has already been PCT processed, the as-fabricated aerial images of the cell can be obtained from the cell library and used in the design layout, rather than using the idealized polygon representation of cell. Because PCT processing capability can vary between different semiconductor fabrication facilities, multiple fab-specific versions of a given PCT processed cell may be created. Therefore, a given fab-specific cell library may be generated, or fab-specific data typing may be used to distinguish between PCT processed cells for different fabs in a common cell library. More specifically, the PCT processed cells and corresponding aerial/post-etch images can be created on separate layout data file layers or could be on individual data types within each layer.

The PCT processed version of a particular cell should be selected from the cell library according to the fabrication facility to be used. Appropriate mapping during cell library export should ensure delivery of the correct cell library to a given customer. Also, the aerial images may be encrypted in the cell library to be kept from view of unauthorized entities. It should be appreciated that by doing cell-level PCT processing and creating an associated PCT processed cell library, post-design processing of the layout data file is greatly reduced. Moreover, when the PCT processed cells are provided to the fabricator, the required PCT processing by the fabricator is significantly reduced, particularly in the front end of line levels.

Figure 3:
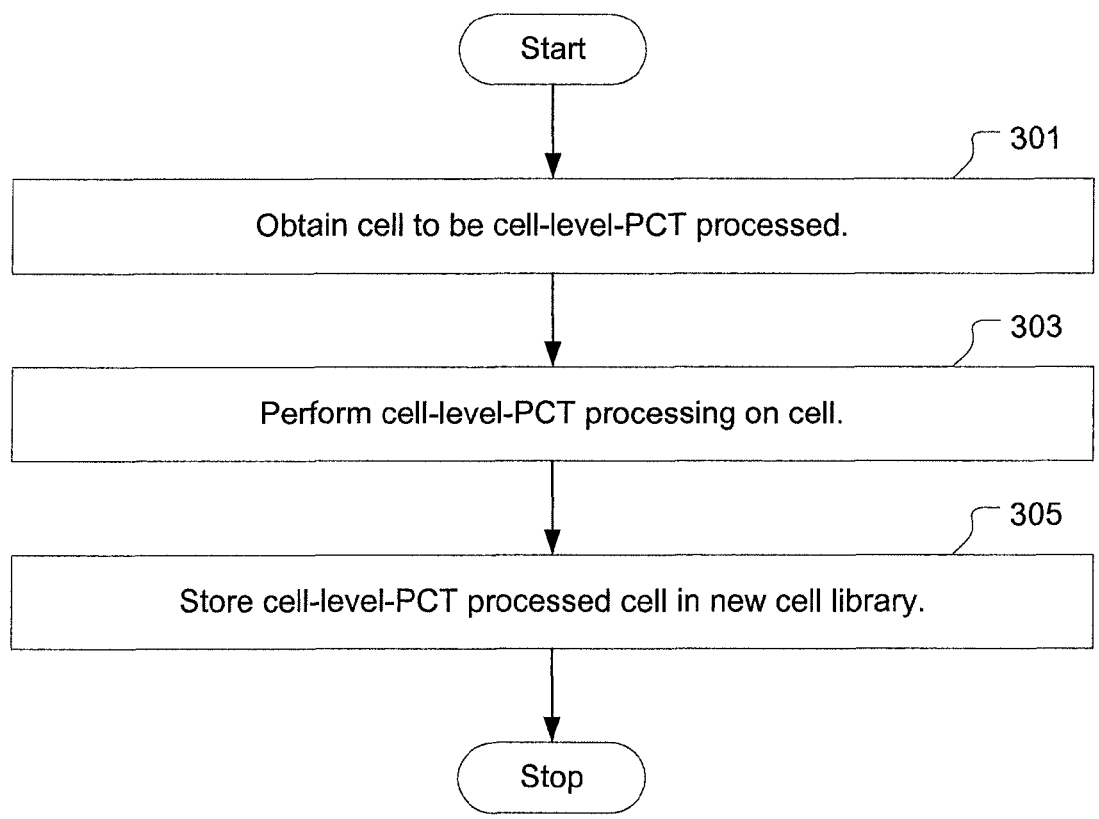
FIG. 3 is an illustration showing a flowchart of a method for generating a library of PCT processed cells for use in an integrated circuit design, in accordance with one embodiment of the present invention.

FIG. 3 is an illustration showing a flowchart of a method for generating a library of PCT processed cells for use in an integrated circuit design, in accordance with one embodiment of the present invention. The method includes an operation 301 for obtaining a cell to be cell-level-PCT processed. The cell obtained in operation 301 can be acquired from an existing cell library, created by modification of a cell acquired from an existing cell library, or created from scratch. The method then proceeds with an operation 303 for performing cell-level-PCT processing on a number of levels of the obtained cell. The operation 303 is performed in effectively the same manner as the operation 103 previously described with regard to FIGS. 1A and 1B.

The difference with regard to operation 303 and the method of FIG. 1B is that in the operation 303 the cell is not associated with a particular layout. Therefore, the cell-level-PCT processing of a given level of the cell in operation 303 is performed in an iterative manner until an acceptable as-fabricated aerial image of the given cell level is obtained based on measured edge differentials. The method further includes an operation 305 for storing the cell having been cell-level-PCT processed in a new cell library. Operations 301-305 are repeated for a number of cells to generated the library of PCT processed cells for use in integrated circuit design. The generated library of PCT processed cells also includes the simulated as-fabricated aerial image of each PCT processed level of each cell.

By giving the cell library more insight into how the layout shapes of a cell are going to look after PCT processing, it is possible to more accurately split up the circuit/device components of the cells to develop improved models for circuitry to be defined on the chip. With regard to transistors, the characteristics of the active region, i.e., diffusion region, surrounding each transistor gate will impact the transistor characteristics. For example, stress from shallow trench isolation (STI) can impact the channel mobility of the transistor, depending on how much the active region overlaps the channel in the horizontal direction. Because the gain of the transistor depends primarily on channel mobility, which is directly proportional to the overlap of the channel by the active region, it follows that the gain of the transistor is higher when there is more overlap of the channel by the active region. Therefore, it should understood that the accuracy of transistor analysis can be improved by slicing the transistor into segments that are distinguished from each other by active region characteristics. The different transistor segments can be modeled independently for more accurate transistor simulation during the cell-level circuit extraction.

Figure 4A:
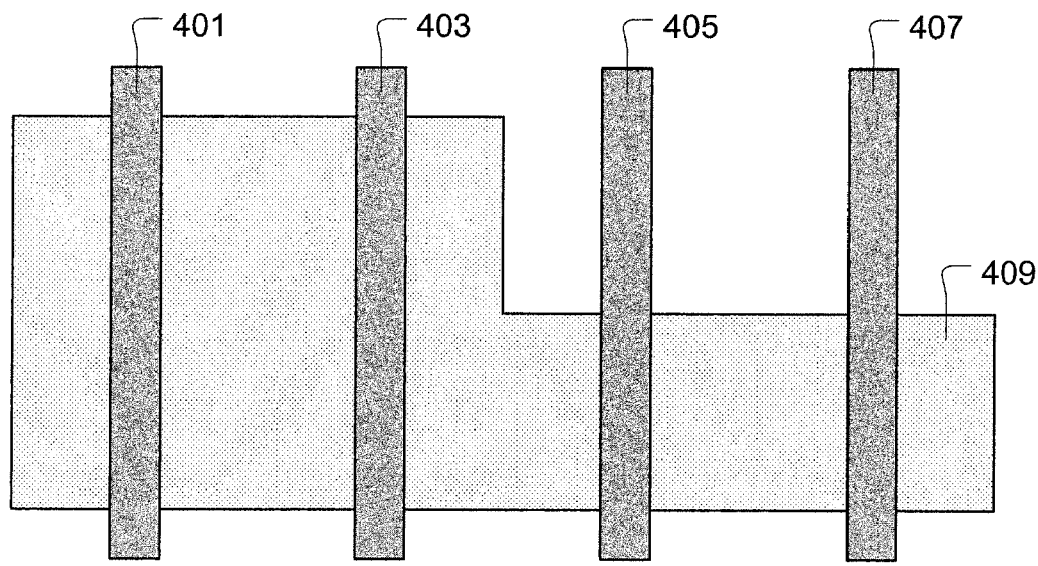
FIG. 4A is an illustration showing an exemplary layout of a number of transistors, in accordance with one embodiment of the present invention.
Figure 4B:
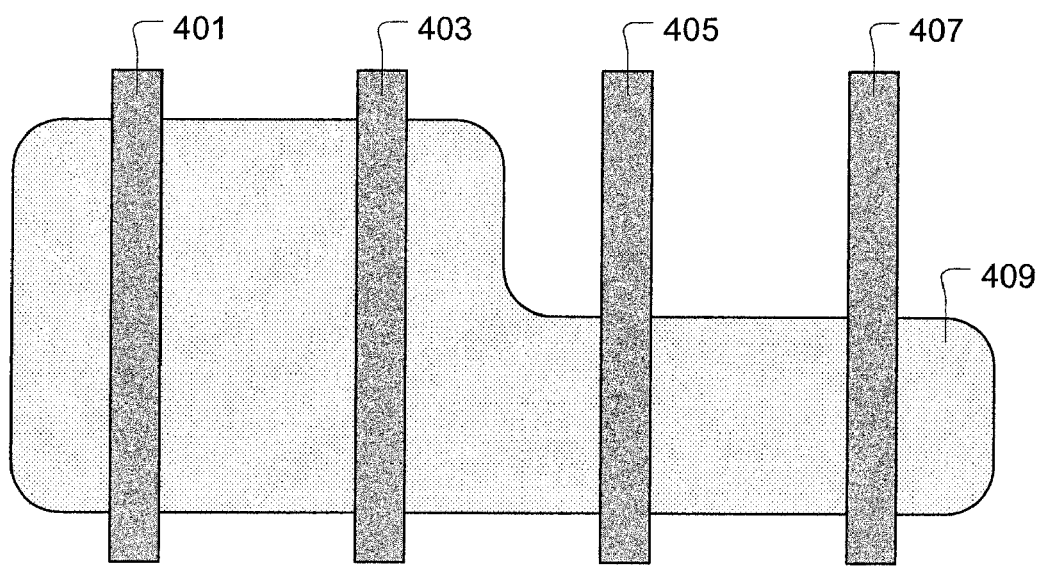
FIG. 4B is an illustration showing a simulated aerial image of the as-fabricated active region, in accordance with one embodiment of the present invention.

FIG. 4A is an illustration showing an exemplary layout of a number of transistors, in accordance with one embodiment of the present invention. Each of the transistors includes a respective gate electrode 401, 403, 405, 407 that extends over an active region 409. The layout of FIG. 4A represents the idealized polygon layout of the active region 409 and gate electrodes 401-407. The as-fabricated active region 409 will not exactly match the idealized polygon representation in the layout. For example, the corners of the as-fabricated active region 409 may be somewhat rounded. FIG. 4B is an illustration showing a simulated aerial image of the as-fabricated active region 409, in accordance with one embodiment of the present invention. The gate electrodes 401-407 in FIG. 4B continue to be shown based on their idealized polygon layout. As shown in FIG. 4B, the corners of the as-fabricated active region 409 are rounded.

Rounding of the active region 409 corners causes the active region characteristics to vary along the length of the gate electrodes 401, 403, and 407, on either side thereof. It should be noted, however, that the active region characteristics are consistent along the length of the gate electrode 405. As previously mentioned, to enable more accurate modeling, each transistor can be sliced into segments along the length of its gate electrode, such that each transistor segment is distinguished from an adjoining transistor segment according to its surrounding active region characteristics.

Figure 4C:
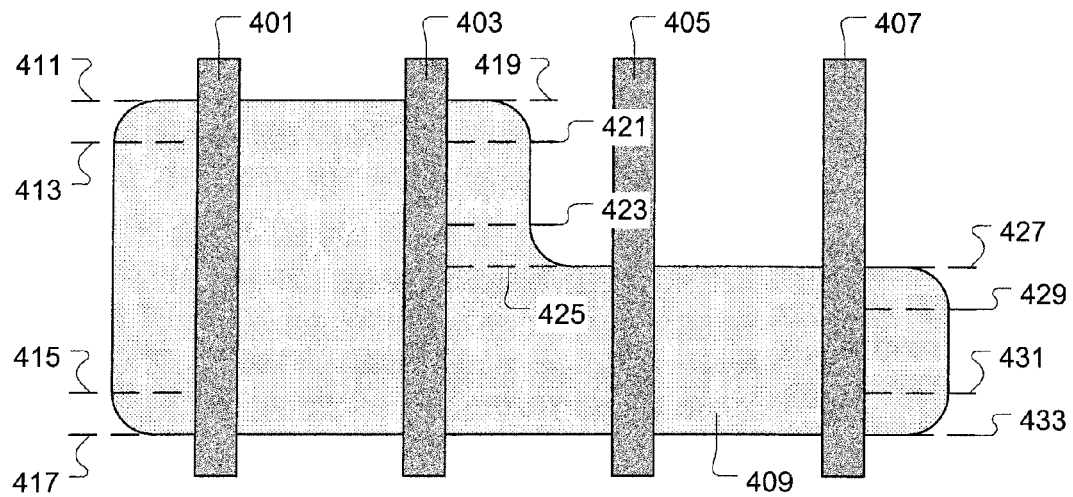
FIG. 4C is an illustration showing a delineation of differentiated active region areas along each side of each gate electrode, based on the simulated aerial image of the as-fabricated active region, in accordance with one embodiment of the present invention.

FIG. 4C is an illustration showing a delineation of differentiated active region areas along each side of each gate electrode 401-407, based on the simulated aerial image of the as-fabricated active region 409, in accordance with one embodiment of the present invention. More specifically, lines 411-417 delineate changes in the as-fabricated active region 409 shape along the left side of the gate electrode 401. The active region 409 is consistent along the right side of gate electrode 401/left side of gate electrode 403. Lines 419-425 delineate changes in the as-fabricated active region 409 shape along the right side of the gate electrode 403. The active region 409 is consistent along the left and right sides of gate electrode 405. Also, the active region 409 is consistent along the left side of gate electrode 407. Lines 427-433 delineate changes in the as-fabricated active region 409 shape along the right side of the gate electrode 407. The delineation of the as-fabricated active region 409 shape along each side of each gate electrode can be used to slice the transistors into segments for independent, segment-based analysis.

Figure 4D:
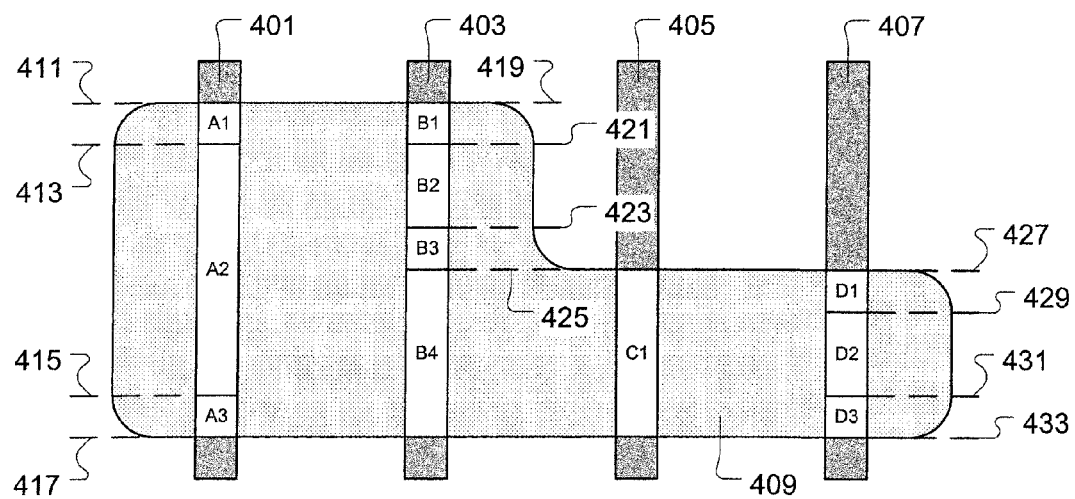
FIG. 4D is an illustration showing a slicing of the transistors based on the delineation of differentiated active region areas as shown in FIG. 4C, in accordance with one embodiment of the present invention.

FIG. 4D is an illustration showing a slicing of the transistors based on the delineation of differentiated active region areas as shown in FIG. 4C, in accordance with one embodiment of the present invention. Each transistor corresponding to gate electrodes 401-407 is sliced into segments along its length, such that each transistor segment is distinguished from an adjoining transistor segment by its surrounding active region characteristics. Therefore, the transistors are sliced such that each slice of a given transistor represents a different combination of associated active region characteristics relative to its adjoining slices. For example, the transistor associated with gate electrode 401 is sliced into segments A1, A2, and A3. The transistor associated with gate electrode 403 is sliced into segments B1, B2, B3, and B4. The transistor associated with gate electrode 405 does not require slicing; therefore, a single segment C1 is specified. The transistor associated with gate electrode 407 is sliced into segments D1, D2, and D3.

Analysis models, e.g., SPICE models, for transistors allow for specification of different diffusion characteristics along the length of a transistor. Therefore, the slicing of the transistors as described above can facilitate specification of more accurate analysis models of the transistors. In one embodiment, the analysis modeling capability should support slicing of a transistor into segment sizes as small as about 1 nanometer to about 5 nanometers. The transistor slicing can be done as part of the cell-level extraction, i.e., before chip-level place and route. Also, in one embodiment, sliced transistors can be recombined into a composite device to avoid an increase in the netlist length.

Figure 5:
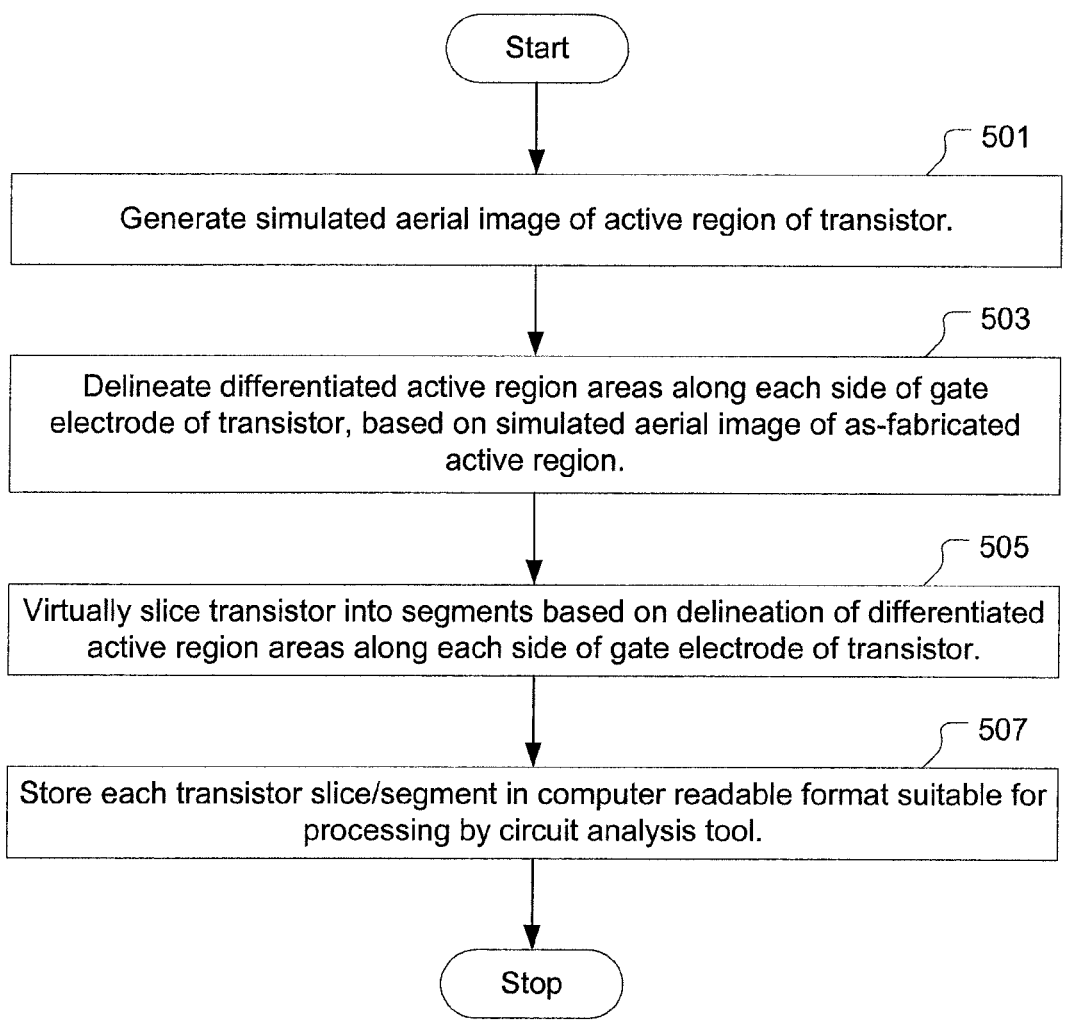
FIG. 5 is an illustration showing a flowchart of a method for slicing a transistor for analysis, in accordance with one embodiment of the present invention.

FIG. 5 is an illustration showing a flowchart of a method for slicing a transistor for analysis, in accordance with one embodiment of the present invention. It should be understood that the method of FIG. 5 is an embodiment of the transistor slicing process as described above with regard to FIGS. 4A-4D. In an operation 501, a simulated aerial image of the as-fabricated active region is generated. An operation 503 is then performed to delineate differentiated active region areas along each side of a gate electrode of the transistor, based on the simulated aerial image of the as-fabricated active region generated in operation 501. An operation 505 is then performed to virtually slice the transistor into segments based on the delineation of differentiated active region areas along each side of the gate electrode of the transistor. The transistor is virtually sliced in operation 505 such that each slice of the transistor represents a different combination of associated active region characteristics relative to its adjoining slices. In an operation 507, each transistor slice/segment is stored in a computer readable format suitable for processing by a circuit analysis tool.

The invention described herein can be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Additionally, a graphical user interface (GUI) implemented as computer readable code on a computer readable medium can be developed to provide a user interface for performing any embodiment of the present invention.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for designing an integrated circuit, comprising:
    generating a layout of one or more cells to satisfy a netlist of the integrated circuit;
    performing cell-level process compensation technique (PCT) processing on a number of levels of one or more cells in the layout to generate a PCT processed version of the one or more cells in the layout;
    operating a computer to generate an as-fabricated aerial image of the PCT processed levels of the one or more cells to facilitate evaluation of PCT processing adequacy; and
    performing cell-level circuit extraction on the PCT processed version of the one or more cells using the generated as-fabricated aerial images,
    wherein the cell-level PCT processing and cell-level circuit extraction are performed before placing and routing of the layout on a chip.

2. A method for designing an integrated circuit as recited in claim 1, wherein each cell represents an abstraction of a logic function in the netlist and encapsulates lower-level integrated circuit layouts for implementing the logic function.

3. A method for designing an integrated circuit as recited in claim 1, wherein the PCT processing on a given cell level is performed in an iterative manner until an acceptable as-fabricated aerial image of the given cell level is obtained based on measured edge differentials.

4. A method for designing an integrated circuit as recited in claim 3, wherein the edge differentials are measured between feature contours in the as-fabricated aerial image and corresponding features in a layout of the cell level prior to PCT processing.

5. A method for designing an integrated circuit as recited in claim 1, wherein the as-fabricated aerial image of a given cell level is generated using a tool defined to simulate how features of a layout of the given cell level will appear when fabricated using specified processes and equipment.

6. A method for designing an integrated circuit as recited in claim 1, further comprising:
storing the PCT processed version of the one or more cells and corresponding as-fabricated aerial images in a cell library.

7. A method for designing an integrated circuit as recited in claim 1, wherein the cell-level PCT processing is performed on a given cell level by defining a lithographic buffer region around the given cell level, wherein the lithographic buffer region is defined to include a number of features that simulate a neighborhood of the given cell level on the chip.

8. A method for designing an integrated circuit as recited in claim 7, wherein the lithographic buffer region associated with the given cell level is defined to extend outward from the given cell level to cover an area capable of lithographically influencing the given cell level.

9. A method for designing an integrated circuit as recited in claim 7, wherein the lithographic buffer region is defined by surrounding the given cell level with duplicate instantiations of the given cell level.

10. A method for designing an integrated circuit as recited in claim 9, wherein the duplicate instantiations are defined as a mirror image of the given cell level.

11. A method for designing an integrated circuit as recited in claim 9, wherein the duplicate instantiation are defined to have an orientation equivalent to an orientation of the given cell level.

12. A method for designing an integrated circuit as recited in claim 1, further comprising:
performing chip-level place and route, chip-level circuit extraction, and chip-level timing closure, wherein cell-level circuit extraction results are used to perform the chip-level timing closure.

13. A method for designing an integrated circuit as recited in claim 1, further comprising:
performing layout versus schematic analysis and design rule checking to obtain zero errors;
performing chip-level PCT processing on interconnect levels of the chip, wherein the previously performed cell-level PCT processing is used for device levels of the chip; and
generating a data file of the integrated circuit design.

14. A method for designing an integrated circuit as recited in claim 1, wherein the cell-level PCT processing is performed on each of the one or more cells without explicit consideration of placement of the one or more cells on the chip.

15. A method for designing an integrated circuit as recited in claim 1, wherein each of the one or more cells is defined according to a regular architecture, the regular architecture defined by placement of linear features on a regular-spaced grid in a number of levels of a given cell, such that the linear features in a given cell level are oriented to be substantially parallel with each other in their traversal direction across the given cell, and wherein each linear feature is defined to be devoid of a substantial change in direction relative to its traversal direction across the given cell.

16. A method for designing an integrated circuit as recited in claim 15, wherein the cell-level PCT processing is performed on the given cell level by defining a lithographic buffer region around the given cell level, wherein the lithographic buffer region for the given cell level is defined by mirroring the regular-spaced grid used to define the given cell level outward to fill the lithographic buffer region, and by populating the regular-spaced grid in the lithographic buffer region with linear features oriented to be parallel with the linear features in the given cell level.

17. A method for designing an integrated circuit as recited in claim 15, wherein the cell-level PCT processing of the given cell level is performed using linear optical proximity correction (OPC) shapes.

18. A method for designing an integrated circuit as recited in claim 1, wherein the cell-level circuit extraction includes explicit device extraction, parasitic device extraction, interconnect extraction, or any combination thereof.

19. A method for designing an integrated circuit as recited in claim 1, wherein the cell-level circuit extraction serves to generate a reverse annotated netlist of the one or more cells.

20. A method for designing an integrated circuit as recited in claim 19, wherein the reverse annotated netlist is defined for use in circuit simulation, static timing analysis, signal integrity analysis, power analysis, layout versus schematic analysis, design rule checking, or any combination thereof.

21. A method for designing an integrated circuit as recited in claim 1, wherein different types of cell-level circuit extraction are performed on the one or more cells to generate different types of reverse annotated netlists of the one or more cells.

* * * * *